United States Patent
Fukuyoshi

(10) Patent No.: US 9,739,188 B2
(45) Date of Patent: Aug. 22, 2017

(54) ENGINE APPARATUS

(71) Applicant: YANMAR CO., LTD., Osaka (JP)

(72) Inventor: Shinya Fukuyoshi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 77 days.

(21) Appl. No.: 14/416,210

(22) PCT Filed: Jul. 23, 2013

(86) PCT No.: PCT/JP2013/069851
§ 371 (c)(1),
(2) Date: Jan. 21, 2015

(87) PCT Pub. No.: WO2014/017459
PCT Pub. Date: Jan. 30, 2014

(65) Prior Publication Data
US 2015/0204221 A1    Jul. 23, 2015

(30) Foreign Application Priority Data
Jul. 26, 2012  (JP) ................................. 2012-165917

(51) Int. Cl.
*F01N 3/06* (2006.01)
*B01D 50/00* (2006.01)
(Continued)

(52) U.S. Cl.
CPC .............. *F01N 3/0211* (2013.01); *B60K 5/12* (2013.01); *B60K 13/04* (2013.01); *F01N 3/021* (2013.01);
(Continued)

(58) Field of Classification Search
CPC .... F01N 3/08; F01N 13/1822; F01N 13/1855; F01N 2590/08; B01D 50/00;
(Continued)

(56) References Cited

U.S. PATENT DOCUMENTS 4,465,252 A * 8/1984 Donovan, Jr. ............ F16L 3/20
  248/589
8,926,726 B2 * 1/2015 Mitsuda .................. F01N 13/00
  422/169

(Continued)

FOREIGN PATENT DOCUMENTS

JP         62-14138       1/1987
JP         3-25826        3/1991
(Continued)

OTHER PUBLICATIONS

Microfilm of the specification and drawings annexed to the request of Japanese utility Model Application No. 85370/1989 (Laid-open No. 25826/1991) (JP 3-25826) (Daihatsu Motor Co., Ltd.), fig. 3 to 7 (Family: none).

(Continued)

*Primary Examiner* — Jacob T Minskey
*Assistant Examiner* — Minh-Chau Pham
(74) *Attorney, Agent, or Firm* — Norris McLaughlin & Marcus, P.A.

(57) ABSTRACT

An object in mounting an engine on an exhaust gas purifier is to ensure the coupling strength between the engine and a hanger and to balance the whole engine at the time of lifting while avoiding interference between the exhaust gas purifier and the hanger. An engine apparatus includes an exhaust gas purifier configured to purify exhaust gas from the engine. The exhaust gas purifier is mounted on the engine through a mounting base. A lower end of the hanger, which is configured to lift the engine, is fastened to the mounting base. An upper end of the hanger is extended along an outer periphery of the exhaust gas purifier.

6 Claims, 32 Drawing Sheets

(51) Int. Cl.

| | | |
|---|---|---|
| *B01D 39/06* | (2006.01) | |
| *B01D 39/14* | (2006.01) | |
| *B01D 39/20* | (2006.01) | |
| *B01D 24/00* | (2006.01) | |
| *B01D 59/50* | (2006.01) | |
| *F01N 3/021* | (2006.01) | |
| *B60K 13/04* | (2006.01) | |
| *F01N 13/18* | (2010.01) | |
| *F01N 3/035* | (2006.01) | |
| *F01N 13/00* | (2010.01) | |
| *B60K 5/12* | (2006.01) | |

(52) U.S. Cl.
CPC ......... *F01N 3/035* (2013.01); *F01N 13/0097* (2014.06); *F01N 13/1822* (2013.01); *F01N 13/1855* (2013.01); *F01N 2590/08* (2013.01)

(58) Field of Classification Search
CPC ........ B01D 39/06; B01D 39/14; B01D 39/20; B01D 24/00; B01D 59/50
USPC ................ 55/385.3, DIG. 30, 523, 522, 330; 422/169, 170–172, 177–182
See application file for complete search history.

(56) References Cited

U.S. PATENT DOCUMENTS

| | | | | |
|---|---|---|---|---|
| 2011/0154809 | A1* | 6/2011 | Mitsuda | E02F 9/00 60/311 |
| 2011/0167808 | A1* | 7/2011 | Kosaka | F01N 13/1822 60/311 |
| 2012/0311984 | A1 | 12/2012 | Mitsuda | |
| 2013/0008528 | A1* | 1/2013 | Mitsuda | F01N 3/0211 137/343 |
| 2014/0124285 | A1 | 5/2014 | Kimijima et al. | |
| 2015/0152764 | A1* | 6/2015 | Fukuyoshi | F01N 13/0097 60/298 |
| 2016/0024752 | A1* | 1/2016 | Mitsuda | E02F 9/0866 180/296 |
| 2016/0046181 | A1* | 2/2016 | Nishimura | F01N 13/1805 180/309 |
| 2016/0061086 | A1* | 3/2016 | Shiomi | F02D 41/029 60/311 |
| 2016/0069247 | A1* | 3/2016 | Rodecker | F01N 13/1822 248/635 |
| 2016/0096426 | A1* | 4/2016 | Kurokawa | B60K 13/04 180/309 |

FOREIGN PATENT DOCUMENTS

| | | |
|---|---|---|
| JP | 2000-145430 | 5/2000 |
| JP | 2002-168131 | 6/2002 |
| JP | 2003-027922 | 1/2003 |
| JP | 2010-071176 | 4/2010 |
| JP | 2011-196194 | 10/2011 |
| JP | 2012-72722 | 4/2012 |
| JP | 2013-11126 | 1/2013 |
| JP | 2013-173428 | 9/2013 |

OTHER PUBLICATIONS

Microfilm of the specification and drawings annexed to the request of Japanese Utility Model Application No. 107110/1985 (Laid-open No. 14138/1987) (JP62-14138) (JP62-14138) (Daihatsu Motor Co., Ltd.) Jan. 28, 1087 (Jan. 28, 1987), fig. 1 to 4 (Family: none).

* cited by examiner

ENGINE APPARATUS

TECHNICAL FIELD

The present invention relates to an engine apparatus mounted on a working machine such as a construction civil-engineering machine, an agricultural machine, and an engine generator.

BACKGROUND OF THE INVENTION

Recently, high-order emission control has been applied to diesel engines (hereinafter simply referred to as engine). Accordingly, it has been desired to mount an exhaust gas purifier to purify atmospheric pollutants contained in exhaust gas on a working machine such as a construction civil-engineering machine, an agricultural machine, and an engine generator on which an engine is mounted. As an exhaust gas purifier, a diesel particulate filter (hereinafter referred to as DPF) to collect particulate matter and such substances contained in exhaust gas has been known (see patent documents 1 to 3).
Patent Documents
  Patent Document 1: Japanese Unexamined Patent Application Publication No. 2000-145430.
  Patent Document 2: Japanese Unexamined Patent Application Publication No. 2003-27922.
  Patent Document 3: Japanese Unexamined Patent Application Publication No. 2010-71176.

In the DPF, particulate matter is accumulated in a soot filter with years of service. There is a technique of burning and removing such particulate matter at the time of driving the engine to restore the soot filter. It has been known that restoration of the soot filter occurs when an exhaust gas temperature is equal to or higher than a restorable temperature (approximately 300° C., for example). Consequently, the temperature of exhaust gas passing the DPF is desirably equal to or higher than the restorable temperature. In view of this, since long before, there has been a demand for mounting the DPF at a position where the exhaust gas temperature is high, that is, directly on the engine.

Conventionally, an engine has included hangers used for mounting or dismounting the engine on or from a working machine. In consideration of support strength, hangers of this kind are fastened to a cylinder head or a cylinder block of the engine. When the engine is mounted on or dismounted from the working machine, for example, wire rope is inserted in through holes formed in a pair of hangers, and the wire rope is engaged with such a component as a hook of a chain block. Thus, the engine is hoisted.

When a DPF is attached to the engine, coupling strength between the engine and the hangers should be secured, and balance of the whole engine at the time of hoisting should be secured. In view of this, it is necessary to take the positional relationship between the DPF and the hangers into consideration. For example, interference between the DPF and the hangers should be avoided.

It is a technical object of the present invention to provide an engine apparatus improved in view of the above-described current circumstances.

SUMMARY OF THE INVENTION

According to the invention of, an engine apparatus includes an exhaust gas purifier configured to purify exhaust gas from an engine and mounted on the engine through a mounting base. A lower end of a hanger configured to lift the engine is fastened to the mounting base whereas an upper end of the hanger is extended along an outer periphery of the exhaust gas purifier.

According to the invention in the engine apparatus a fastening portion with respect to the hanger is formed in an outer surface of the mounting base.

According to the invention of in the engine apparatus a strength of the hanger is set to be smaller than a strength of the mounting base.

According to the invention in the engine apparatus a cast-iron bracket body and a sheet-metal bracket body are coupled to constitute the single mounting base. The lower end of the hanger is fastened to the cast-iron bracket body.

According to the invention the engine apparatus includes the exhaust gas purifier configured to purify exhaust gas from the engine and mounted on the engine through the mounting base. The lower end of the hanger configured to lift the engine is fastened to the mounting base whereas the upper end of the hanger is extended along the outer periphery of the exhaust gas purifier. Consequently, the mounting base, which is a highly rigid component to support the exhaust gas purifier, is also used for the fastening portion with respect to the hanger. This reduces the number of components, and at the same time, the hanger is firmly fastened to the engine (the coupling strength of the hanger with respect to the engine is secured).

According to the invention, the fastening portion with respect to the hanger is formed in the outer surface of the mounting base. Therefore, fastening members to fasten the hanger to the mounting base are readily tightened. While balancing the whole engine at the time of lifting and avoiding interference between the exhaust gas purifier and the hanger, the hanger is assembled with the engine in reduced space.

According to the invention, the strength of the hanger is set to be smaller than the strength of the mounting base. This prevents deformation of the mounting base by lifting the engine. As a result, exertion of external force on the exhaust gas purifier is minimized at the time of lifting the engine.

According to the invention, the cast-iron bracket body and the sheet-metal bracket body are coupled to constitute the single mounting base, and the lower end of the hanger is fastened to the cast-iron bracket body. Therefore, through the mounting base made up of the cast-iron bracket body and the sheet-metal bracket body, the exhaust gas purifier is mounted on the engine while saving space and securing sufficient support strength. Coupling with the sheet-metal bracket body complements strength of the cast-iron bracket body, and more reliably prevents external force from being exerted on the exhaust gas purifier at the time of lifting the engine.

DETAILED DESCRIPTION OF THE PREFERRED EMBOCIMENTS

Figure 1:
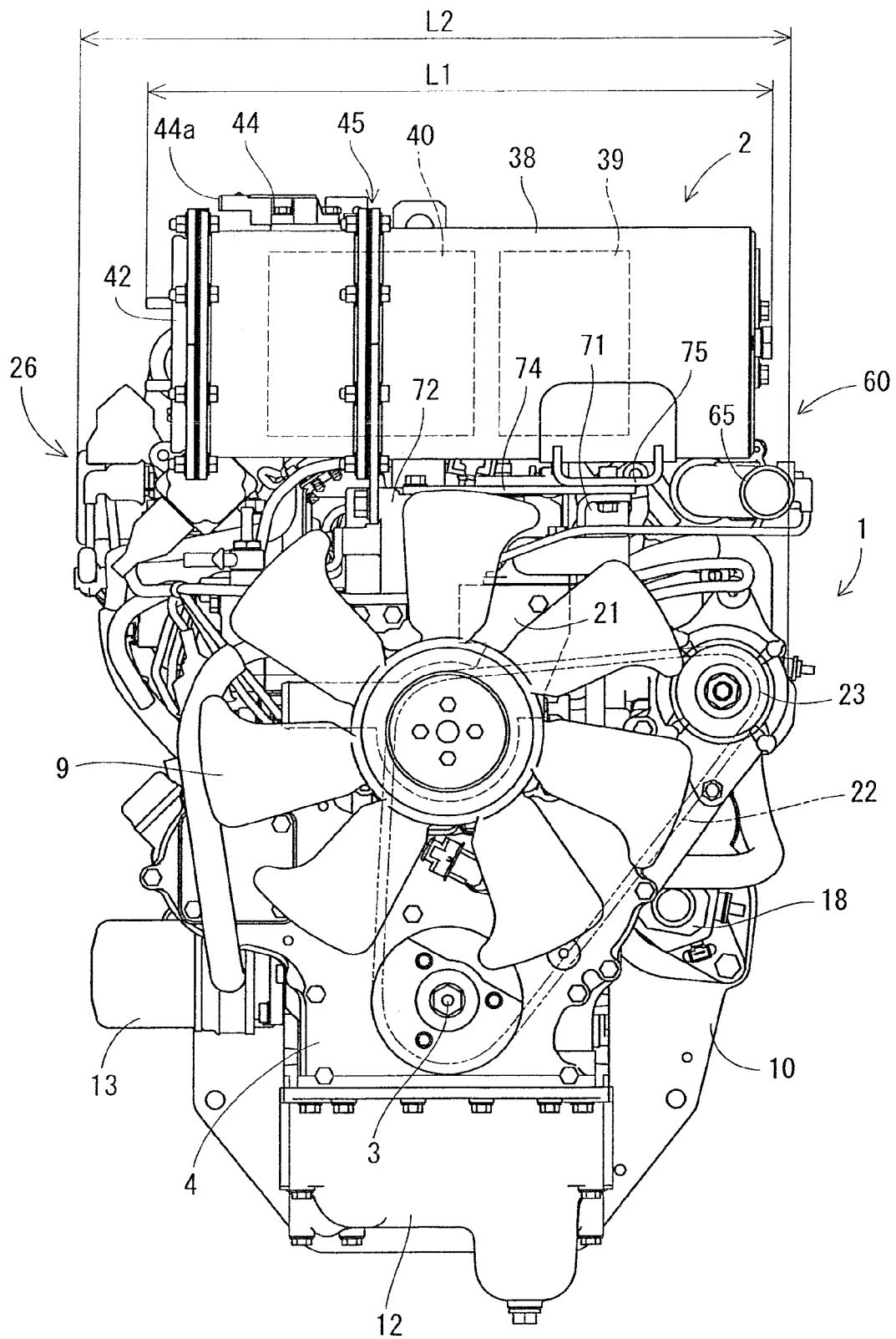
FIG. 1 is a front view of an engine according to a first embodiment.
Figure 2:
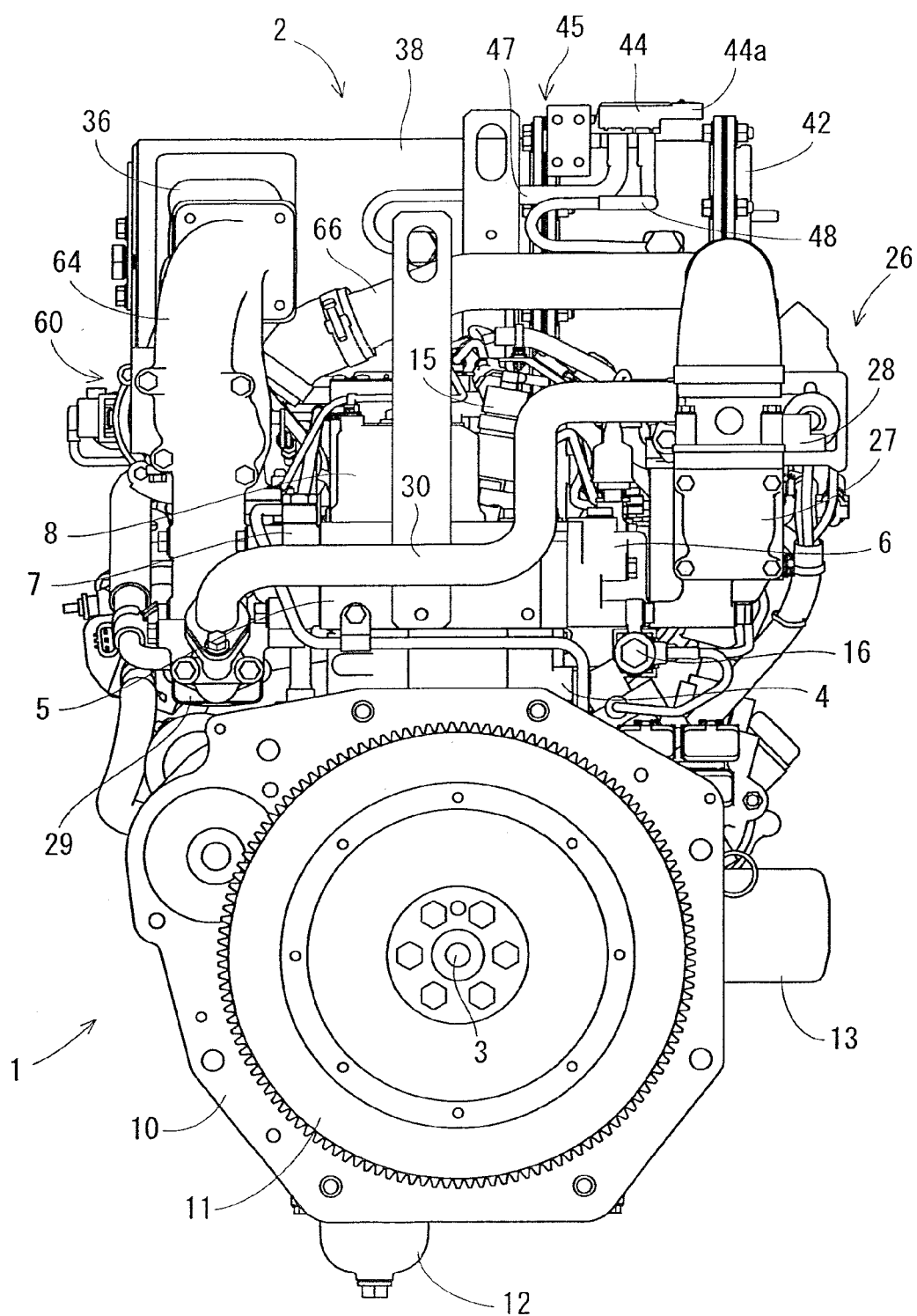
FIG. 2 is a rear view of the engine.
Figure 3:
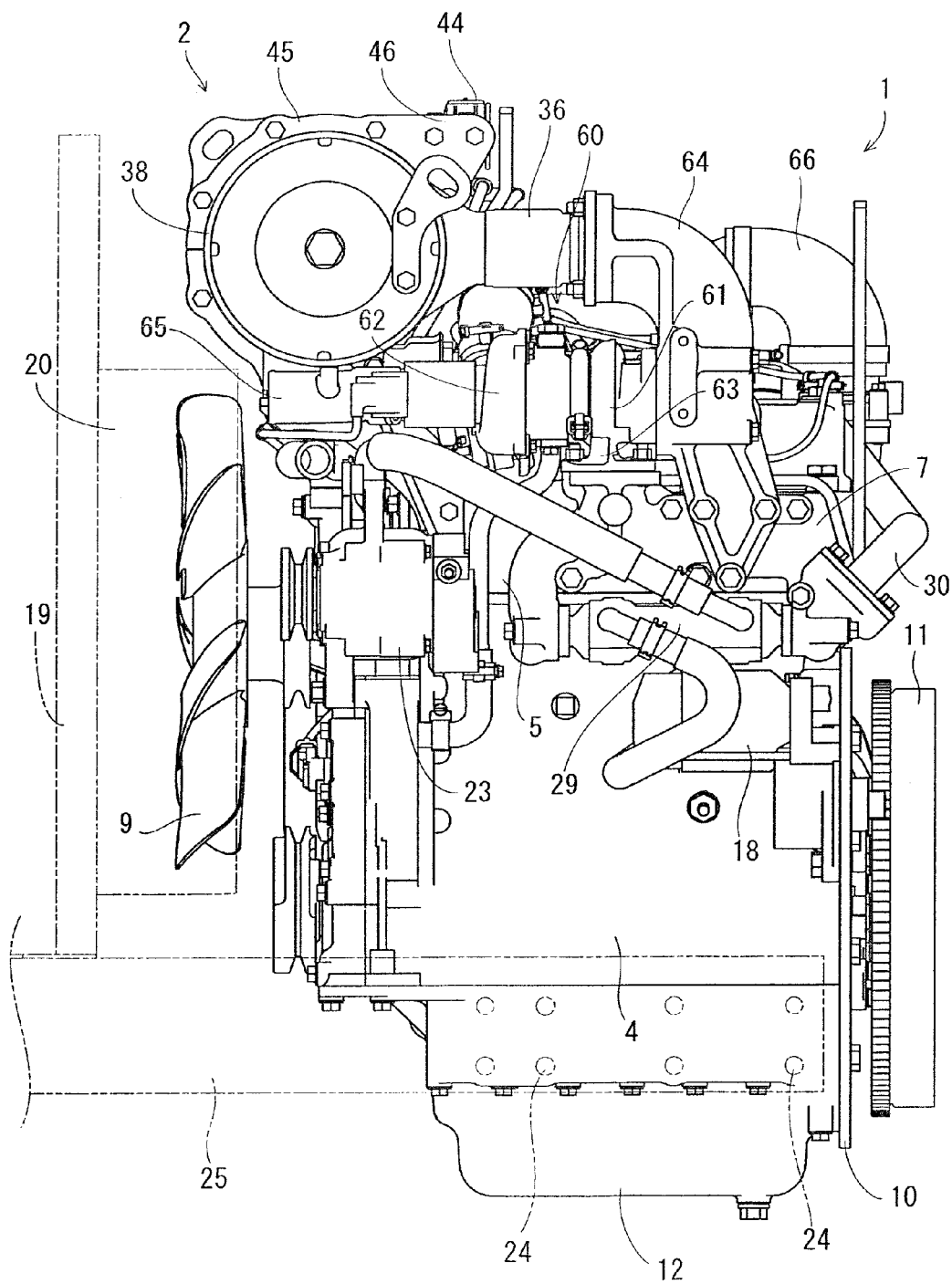
FIG. 3 is a left side view of the engine.

Embodiments of the present invention will be described below with reference to the drawings. First, referring to FIGS. 1 to 8, description will be made on a schematic configuration of a common-rail engine 1 in a first embodiment. It should be noted that in the following description, both sides in an axial direction of an output shaft 3 (portions on both sides of the output shaft 3) will be referred to as left and right. A side on which a cooling fan 9 is disposed will be referred to as the front side. A side on which a flywheel 11 is disposed will be referred to as the rear side. A side on which an exhaust manifold 7 is disposed will be referred to as the left side. A side on which an intake manifold 6 is disposed will be referred to as the right side. For conve- nience' sake, these are regarded as references of a relationship of left, right, front, rear, upper, and lower positions in the engine 1.

As shown in FIGS. 1 to 8, the engine 1 as a prime mover is mounted on a working machine such as a construction civil-engineering machine and an agricultural machine. The engine 1 includes a continuous-regeneration exhaust gas purifier 2 (DPF). The exhaust gas purifier 2 removes particulate matter (PM) contained in exhaust gas emitted from the engine 1 and also reduces carbon monoxide (CO) and hydrocarbon (HC) contained in the exhaust gas.

The engine 1 includes a cylinder block 4 accommodating the output shaft 3 (crank shaft) and pistons (not shown). A cylinder head 5 is mounted on the cylinder block 4. The intake manifold 6 is disposed on the right side surface of the cylinder head 5. The exhaust manifold 7 is disposed on the left side surface of the cylinder head 5. That is, the intake manifold 6 and the exhaust manifold 7 are separately located on both side surfaces of the engine 1 along the output shaft 3. A head cover 8 is disposed on the upper surface of the cylinder head 5. The cooling fan 9 is disposed on a side surface of the engine 1 that intersects the output shaft 3, specifically, on the front surface of the cylinder block 4. A mounting plate 10 is disposed on the rear surface of the cylinder block 4. The flywheel 11 is disposed over the mounting plate 10.

The flywheel 11 is axially supported on the output shaft 3. Motive power of the engine 1 is transmitted to an operation unit of the working machine through the output shaft 3. An oil pan 12 is disposed on the lower surface of the cylinder block 4. Lubrication oil in the oil pan 12 is supplied to lubrication portions of the engine 1 through an oil filter 13 disposed on the right side surface of the cylinder block 4.

A fuel supply pump 14 to supply fuel is attached to the right side surface of the cylinder block 4 that is above the oil filter 13 (below the intake manifold 6). The engine 1 includes injectors 15 for three cylinders provided with electromagnetic-switch control fuel injection valves (not shown). Each of the injectors 15 is coupled to a fuel tank (not shown) mounted on the working machine through the fuel supply pump 14, a cylindrical common rail 16, and a fuel filter (not shown).

Fuel in the fuel tank is supplied under pressure from the fuel supply pump 14 to the common rail 16 through the fuel filter (not shown). The high-pressure fuel is accumulated in the common rail 16. By switch control of the fuel injection valves of the injectors 15, the high-pressure fuel in the common rail 16 is injected from the injectors 15 to the respective cylinders of the engine 1. It should be noted that an engine starter 18 is disposed on the mounting plate 10. A pinion gear of the engine starter 18 meshes with a ring gear of the flywheel 11. When the engine 1 is started, torque of the starter 18 makes the ring gear of the flywheel 11 rotate to cause the output shaft 3 to start rotating (to execute so-called cranking).

A coolant pump 21 is disposed on the front side of the cylinder head 5 (on the cooling fan 9 side) to be coaxial with a fan shaft of the cooling fan 9. An alternator 23 is disposed on the left side of the engine 1, specifically on the left side of the coolant pump 21. The alternator 23 serves as a generator to generate electricity by motive power of the engine 1. Through a cooling fan driving V belt 22, rotation of the output shaft 3 drives not only the cooling fan 9 but also the coolant pump 21 and the alternator 23. A radiator 19 (see FIGS. 3 and 4) mounted on the working machine contains coolant. The coolant pump 21 is driven to supply the coolant to the cylinder block 4 and the cylinder head 5, thereby cooling the engine 1.

Engine leg attachment portions 24 are disposed on the left and right side surfaces of the oil pan 12. Engine legs (not shown) including rubber vibration isolators are respectively fastened by bolts to the engine leg attachment portions 24. In the first embodiment, the oil pan 12 is clamped by a pair of left and right engine support chassis 25 in the working machine. The engine leg attachment portions 24 on the oil pan 12 side are fastened by bolts to the engine support chassis 25. Thus, both the engine support chassis 25 of the working machine support the engine 1.

A radiator 19 stands on the pair of left and right engine support chassis 25 and is located on the front side of the engine 1. A fan shroud 20 is attached to the rear surface of the radiator 19. The fan shroud 20 covers the outside (outer peripheral side) of the cooling fan 9 and makes the radiator 19 and the cooling fan 9 communicate with each other. The cooling fan 9 is rotated to blow the cooling wind against the radiator 19. Then, the cooling wind flows from the radiator 19 to the engine 1 through the fan shroud 20.

Figure 4:
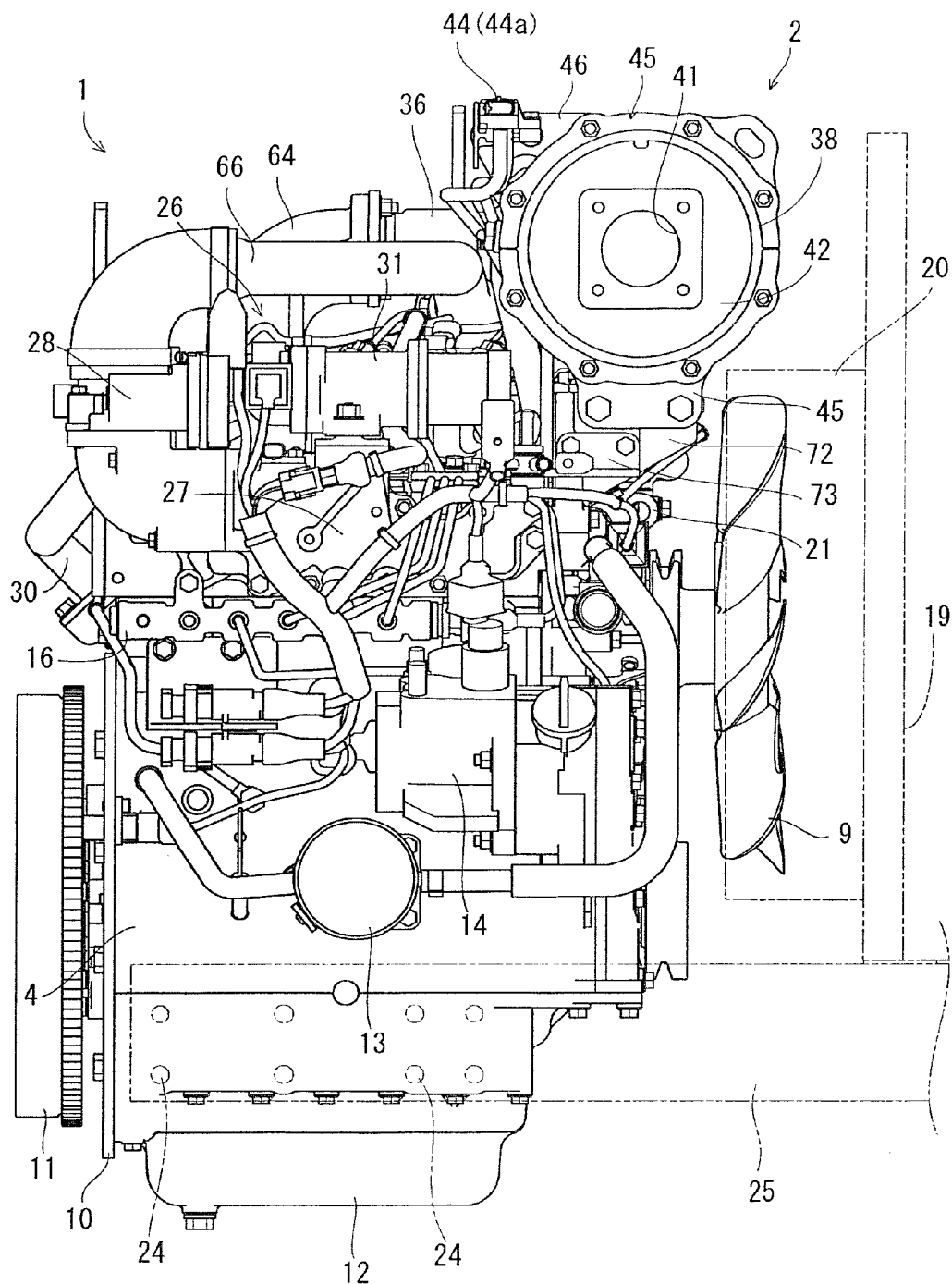
FIG. 4 is a right side view of the engine.
Figure 5:
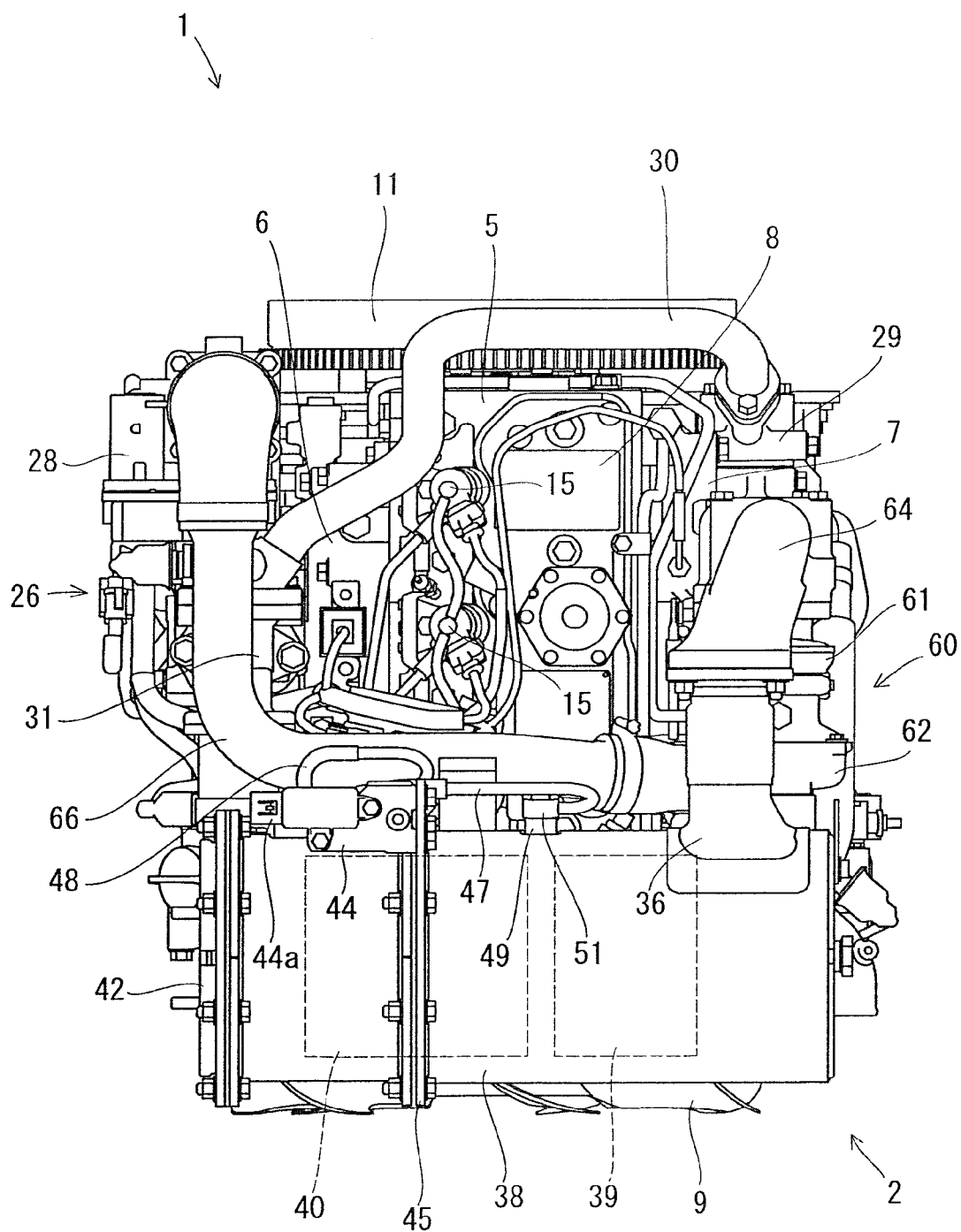
FIG. 5 is a plan view of the engine.
Figure 6:
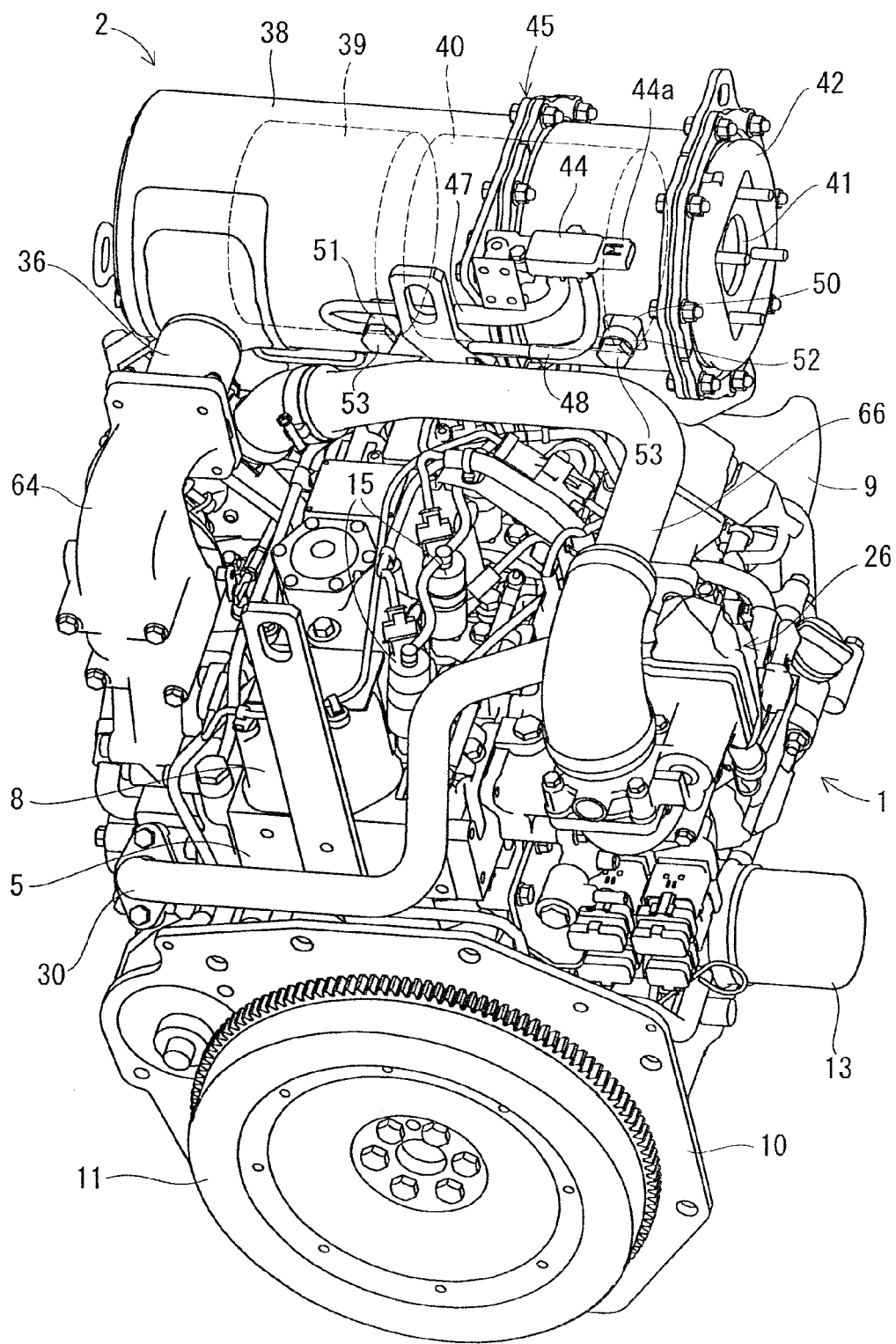
FIG. 6 is an upper rear perspective view of the engine.
Figure 7:
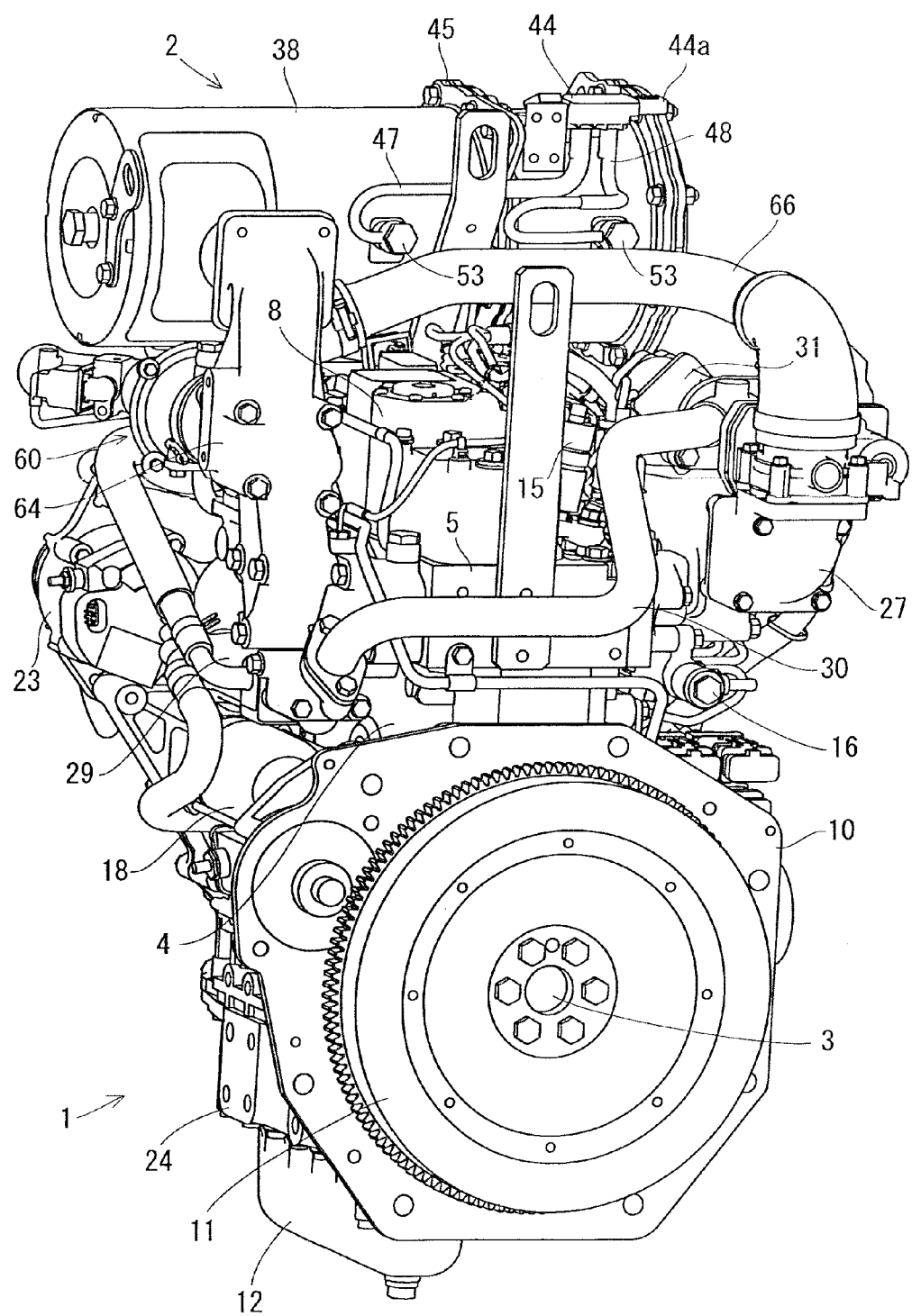
FIG. 7 is a rear perspective view of the engine.
Figure 8:
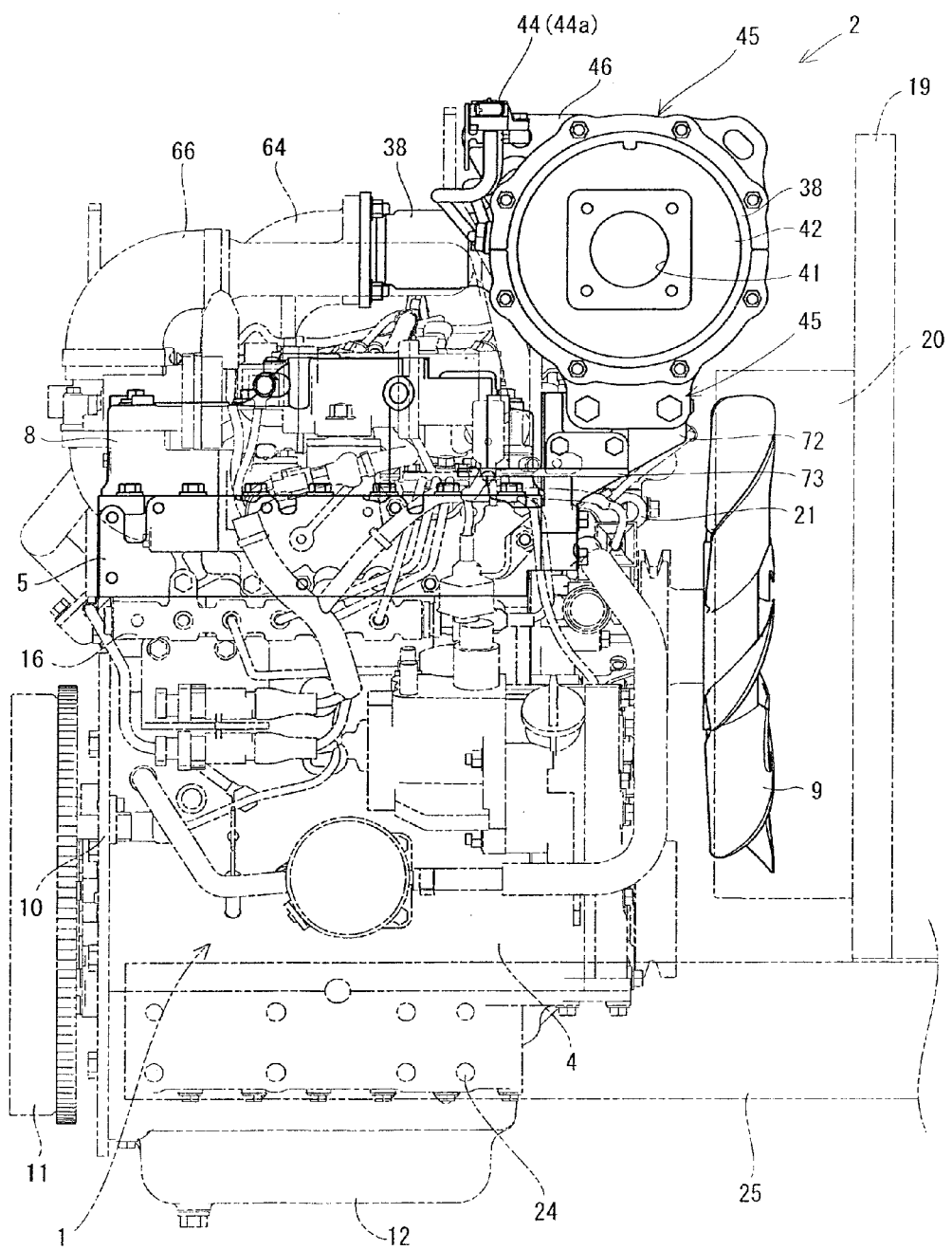
FIG. 8 is a right side view of the engine, illustrating a positional relationship of a cooling fan, a head cover, and an exhaust gas purifier.

As shown in FIGS. 4 to 6, an air cleaner (not shown) is coupled to an inlet portion of the intake manifold 6 through an EGR device 26 (exhaust gas recirculation device). The EGR device 26 is mainly disposed on the right side of the engine 1, specifically, on the right side of the cylinder head 5. Fresh air (outside air) drawn into the air cleaner is dusted and purified by the air cleaner. Then, through a compressor case 62 of a turbosupercharger 60 (which will be described in detail later) and the EGR device 26, the fresh air is sent to the intake manifold 6 and supplied to the cylinders of the engine 1.

The EGR device 26 includes an EGR main body case 27, an intake throttle member 28, a recirculation exhaust gas pipe 30, and an EGR valve member 31. The EGR main body case 27 mixes part of exhaust gas of the engine 1 (EGR gas) with fresh air and supplies the mixture to the intake manifold 6. The intake throttle member 28 communicates the EGR main body case 27 with the compressor case 62. The recirculation exhaust gas pipe 30 is coupled to the exhaust manifold 7 through an EGR cooler 29. The EGR valve member 31 communicates the EGR main body case 27 with the recirculation exhaust gas pipe 30.

Specifically, the intake throttle member 28 is coupled to the intake manifold 6 through the EGR main body case 27. An outlet side of the recirculation exhaust gas pipe 30 is coupled to the EGR main body case 27. An inlet side of the recirculation exhaust gas pipe 30 is coupled to the exhaust manifold 7 through the EGR cooler 29. An opening degree of an EGR valve in the EGR valve member 31 is controlled to regulate an amount of supply of EGR gas to the EGR main body case 27. It should be noted that the EGR main body case 27 is detachably fastened by bolts to the intake manifold 6.

In the above-described configuration, fresh air is supplied from the air cleaner into the EGR main body case 27 through the compressor case 62 and the intake throttle member 28 whereas the EGR gas is supplied from the exhaust manifold 7 into the EGR main body case 27. After the fresh air from the air cleaner and the EGR gas from the exhaust manifold 7 is mixed in the EGR main body case 27, the mixed gas is supplied to the intake manifold 6. Part of exhaust gas emitted from the engine 1 to the exhaust manifold 7 is made to flow back from the intake manifold 6 to the engine 1. This lowers the maximum combustion temperature at the time of high-load driving, thus decreasing an emission volume of NOx (nitrogen oxide) from the engine 1.

The turbosupercharger 60 is disposed on the left side of the cylinder head 5 and above the exhaust manifold 7. The turbosupercharger 60 includes a turbine case 61 and the compressor case 62. The turbine case 61 houses a turbine wheel, and the compressor case 62 houses a blower wheel. An exhaust gas intake pipe 63 of the turbine case 61 is coupled to an outlet portion of the exhaust manifold 7. The exhaust gas purifier 2 is coupled to an exhaust gas discharge pipe 64 of the turbine case 61. Specifically, exhaust gas discharged from the cylinders of the engine 1 to the exhaust manifold 7 is emitted to the outside through such components as the turbosupercharger 60 and the exhaust gas purifier 2.

An air intake side of the compressor case 62 is coupled to an air discharge side of the air cleaner through an air duct 65. An air discharge side of the compressor case 62 is coupled to the intake manifold 6 through a supercharge pipe 66 and the EGR device 26. That is, the fresh air dusted by the air cleaner is sent from the compressor case 62 to the EGR device 26 through the supercharge pipe 66, and then supplied to the cylinders of the engine 1.

Next, the exhaust gas purifier 2 will be described. The exhaust gas purifier 2 includes a purification casing 38 provided with the purification inlet pipe 36. Inside of the purification casing 38, a diesel oxidation catalyst 39 and a soot filter 40 are arranged in series in a direction of movement of exhaust gas. The diesel oxidation catalyst 39 is, for example, platinum, which generates nitrogen dioxide ($NO_2$). The soot filter 40 has a honeycomb structure to continuously oxidizes and removes collected particulate matter (PM) at relatively low temperature. The diesel oxidation catalyst 39 and the soot filter 40 are regarded as a gas purification filter accommodated in the purification casing 38. It should be noted that, for example, a muffler or a tail pipe is coupled to an exhaust gas outlet 41 of the purification casing 38 through an exhaust pipe. Thus, the exhaust gas is emitted from the exhaust gas outlet 41 to the outside through the muffler or tail pipe.

In the above-described configuration, nitrogen dioxide ($NO_2$) generated by oxidation function of the diesel oxidation catalyst 39 is drawn into the soot filter 40. Particulate matter in exhaust gas of the engine 1 is collected by the soot filter 40, and the particulate matter is continuously oxidized and removed by nitrogen dioxide ($NO_2$). This ensures not only removal of the particulate matter (PM) from the exhaust gas of the engine 1 but also decreases of the carbon monoxide (CO) content and the hydrocarbon (HC) content in the exhaust gas of the engine 1.

The purification inlet pipe 36 is disposed on the outer peripheral portion of the purification casing 38 on the exhaust upstream side. A lid member 42 is welded on an end portion of the purification casing 38 at the exhaust downstream side. The end portion of the purification casing 38 at the exhaust downstream side is covered with the lid member 42. An exhaust gas outlet 41 is opened approximately in the center of the lid member 42.

An exhaust pressure sensor 44 is attached to the purification casing 38. The exhaust pressure sensor 44 detects a difference between pressures of exhaust gas on the upstream side and the downstream side of the soot filter 40. The exhaust pressure sensor 44 converts the pressure difference of the exhaust gas into electric signals to be output to the engine controller (not shown). Based on the pressure difference of the exhaust gas between the upstream side and the downstream side of the soot filter 40, an amount of accumulation of particulate matter in the soot filter 40 is calculated to grasp a state of clogging in the soot filter 40.

As shown in FIGS. 1 to 8, a sensor fastening portion 46 with through holes is disposed on an intermediate clamping flange 45 of the purification casing 38 and located on an outer peripheral portion of the purification casing 38 that is on a side opposite the side of the cooling fan 9 (on the head cover 8 side). The exhaust pressure sensor 44 integral with an electric wiring connector 44a is fastened by bolts to the sensor fastening portion 46 of the intermediate clamping flange 45. That is, the electric wiring connector 44a for the exhaust pressure sensor 44 with respect to the exhaust gas purifier 2 is located on the outer peripheral portion of the exhaust gas purifier 2 that is on the side opposite the side of the cooling fan 9. The exhaust pressure sensor 44 is equivalent to a detection member.

One end of an upstream-side sensor pipe 47 and one end of a downstream-side sensor pipe 48 are coupled to the exhaust pressure sensor 44. The purification casing 38 is provided with upstream-side and downstream-side sensor pipe bosses 49 and 50 with the soot filter 40 in the purification casing 38 interposed between the sensor pipe bosses 49 and 50. Through pipe fitting bolts 53, fastening bosses 51 and 52 disposed on the other end of the sensor pipe 47 and the other end of the sensor pipe 48 are respectively fastened to the sensor pipe bosses 49 and 50.

In the above-described configuration, a difference between an exhaust gas pressure at the upstream (inflow) side of the soot filter 40 and an exhaust gas pressure at the downstream (outflow) side of the soot filter 40 (differential pressure of the exhaust gas) is detected by the exhaust pressure sensor 44. The residual amount of particulate matter in the exhaust gas collected by the soot filter 40 is proportional to the differential pressure of the exhaust gas. Consequently, when the residual amount of particulate matter in the soot filter 40 becomes equal to or larger than a predetermined value, restoration control (control for increasing the exhaust gas temperature, for example) is executed based on a detection result of the exhaust pressure sensor 44. Thus, the amount of the particulate matter in the soot filter 40 is reduced. Moreover, when the residual amount of the particulate matter further increases beyond a restoration controllable range, the purification casing 38 is detached and disassembled to clean the soot filter 40. Thus, maintenance work is performed to manually remove the particulate matter.

As described above, the electric wiring connector 44a for the exhaust pressure sensor 44 with respect to the exhaust gas purifier 2 is located on the outer peripheral portion of the exhaust gas purifier 2 that is on the side opposite the side of the cooling fan 9. This allows the electric wiring connector 44a to be positioned at a height approximately equal to or lower than an upper end of the exhaust gas purifier 2. Consequently, with respect to the overall height of the engine 1 including the exhaust gas purifier 2, an influence of the arrangement of not only the electric wiring connector 44a but also the exhaust pressure sensor 44 is minimized or eliminated. This arrangement is effective for reducing the overall height of the engine 1 assembled with the exhaust gas purifier 2 as much as possible, which contributes to size reduction of the engine 1.

Also, the exhaust pressure sensor 44 itself is located on the outer peripheral portion of the exhaust gas purifier 2 that is on the side opposite the side of the cooling fan 9. Therefore, the cooling wind from the cooling fan 9 is hindered from blowing against the exhaust pressure sensor 44 and sensor pipes 47 and 48. This avoids cooling of the exhaust gas in the exhaust pressure sensor 44 and the sensor pipes 47 and 48 by the cooling wind from the cooling fan 9 as much as possible. Thus, erroneous detection of the exhaust pressure sensor 44 is prevented to improve accuracy of restoration control for decreasing the amount of particulate matter in the soot filter 40 (to execute the restoration control appropriately).

As shown in FIGS. 5 to 8, the exhaust gas purifier 2 is supported on the cylinder head 5 on a portion of the upper side of the engine 1 that is closer to the cooling fan 9. Therefore, although the engine 1 after assembled with the exhaust gas purifier 2 is to be shipped, the exhaust gas purifier 2 is supported with high rigidity using the cylinder head 5, which is a highly rigid component of the engine 1. This prevents damage to the exhaust gas purifier 2 due to vibration, for example. Furthermore, the exhaust gas purifier 2 is communicable with the exhaust manifold 7 at close range to maintain the exhaust gas purifier 2 at appropriate temperature. This ensures maintenance of high purification performance of the exhaust gas. As a result, the exhaust gas purifier 2 is reduced in size. In addition, since the exhaust gas purifier 2 is located on the portion of the upper side of the engine 1 that is closer to the cooling fan 9, the cylinder head 5, the intake manifold 6, and the exhaust manifold 7 are exposed upwardly over a wide range. This facilitates maintenance work in relation to the engine 1.

In the first embodiment, a space above the engine 1 between the head cover 8 and the cooling fan 9 exists as a dead space. Consequently, the exhaust gas purifier 2 is located above the engine 1 between the head cover 8 and the cooling fan 9 with the longitudinal direction of the exhaust gas purifier 2 being orthogonal to the output shaft 3 of the engine 1. Therefore, even though the engine 1 is assembled with the exhaust gas purifier 2, the overall height is made as low as possible. The dead space between the head cover 8 and the cooling fan 9 is effectively utilized to make the engine 1 compact.

In the first embodiment, the outer peripheral side of the cooling fan 9 is surrounded by the fan shroud 20 to hinder the cooling wind from the cooling fan 9 from directly blowing against the exhaust gas purifier 2. Therefore, the exhaust gas temperature in the exhaust gas purifier 2 is prevented from being decreased by the cooling wind from the cooling fan 9 as much as possible. Thus, the exhaust gas purification performance of the exhaust gas purifier 2 is maintained appropriately. However, the positional relationship is such that the coolant pump 21 is opposed to the cooling fan 9, and the cooling wind from the cooling fan 9 directly blows against the coolant pump 21. Consequently, the existence of the exhaust gas purifier 2 does not hinder air cooling of the coolant pump 21.

As shown in a front view of FIG. 1, the exhaust gas purifier 2 is located within an installation width L2 of the alternator 23 as a power generator and the EGR device 26 and above the coolant pump 21. In other words, a length L1 of the exhaust gas purifier 2 in the longitudinal direction is smaller than the installation width L2 corresponding to the overall width of the engine 1. The exhaust gas purifier 2 is located above the coolant pump 21 within a range of the installation width L2 corresponding to the overall width of the engine 1. Therefore, even though the engine 1 is assembled with the exhaust gas purifier 2, the overall width of the engine 1 is made as small as possible. This also contributes to size reduction of the engine 1.

Moreover, the pipe 64 between the turbosupercharger 60 and the exhaust gas purifier 2, and the pipe 66 between the turbosupercharger 60 and the EGR device 26 are arranged not to be restricted by the exhaust gas purifier 2. This improves a degree of freedom of the arrangement of the pipes 64 and 66.

Next, a configuration of assembling the engine 1 with the exhaust gas purifier 2 will be described. The exhaust gas discharge pipe 64 is fastened by bolts to the exhaust manifold 7 and the turbine case 61 of the turbosupercharger 60. The purification inlet pipe 36 of the exhaust gas purifier 2 (purification casing 38) is fastened by bolts to the exhaust gas discharge pipe. Through the exhaust gas discharge pipe 64, exhaust gas of the exhaust manifold 7 is supplied from the turbine case 61 of the turbosupercharger 60 to the exhaust gas purifier 2. The exhaust gas discharge pipe 64 also serves as a casing support to support the exhaust gas purifier 2.

Figure 9:
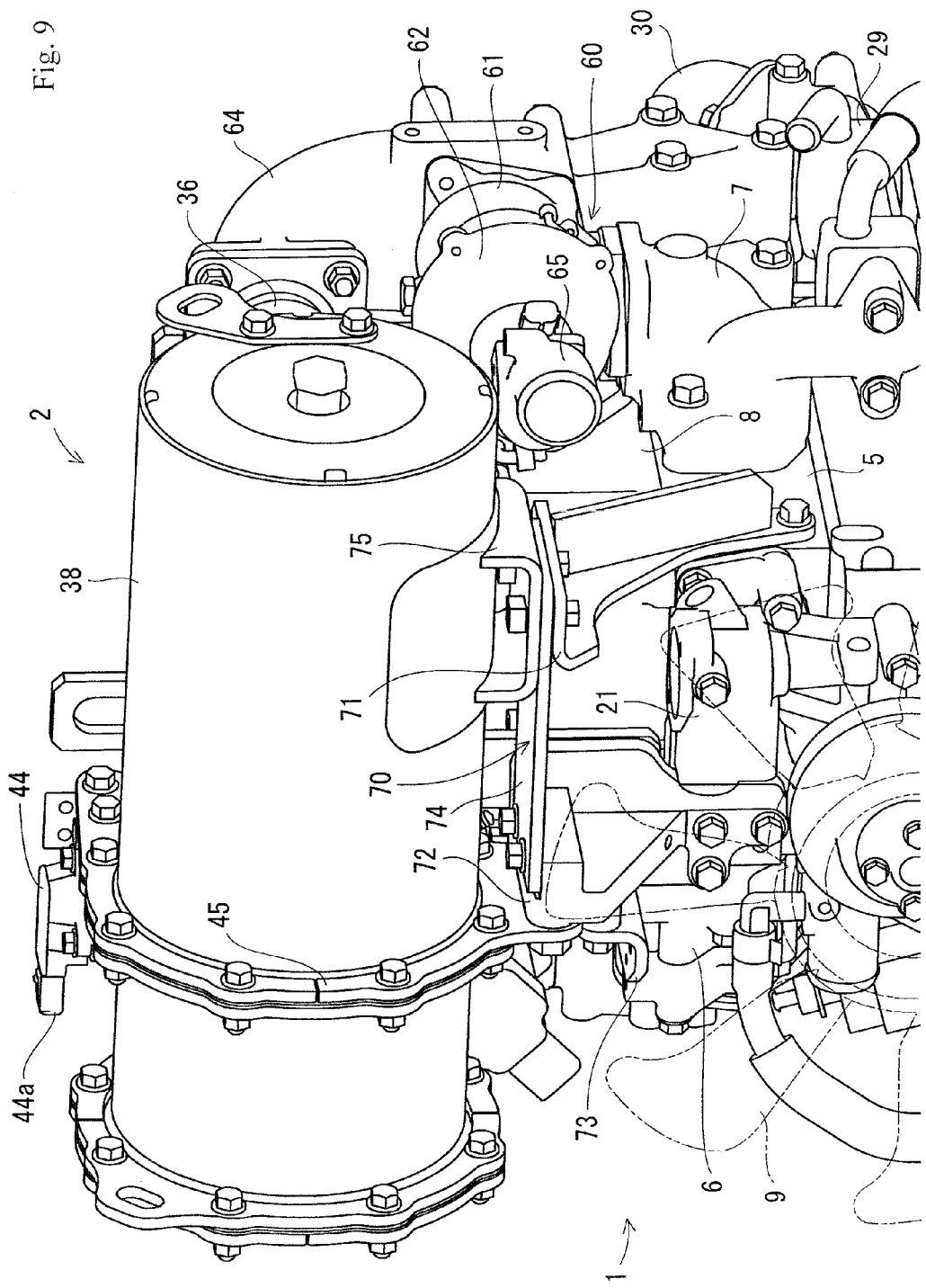
FIG. 9 is an enlarged left front perspective view of the engine and the exhaust gas purifier.
Figure 10:
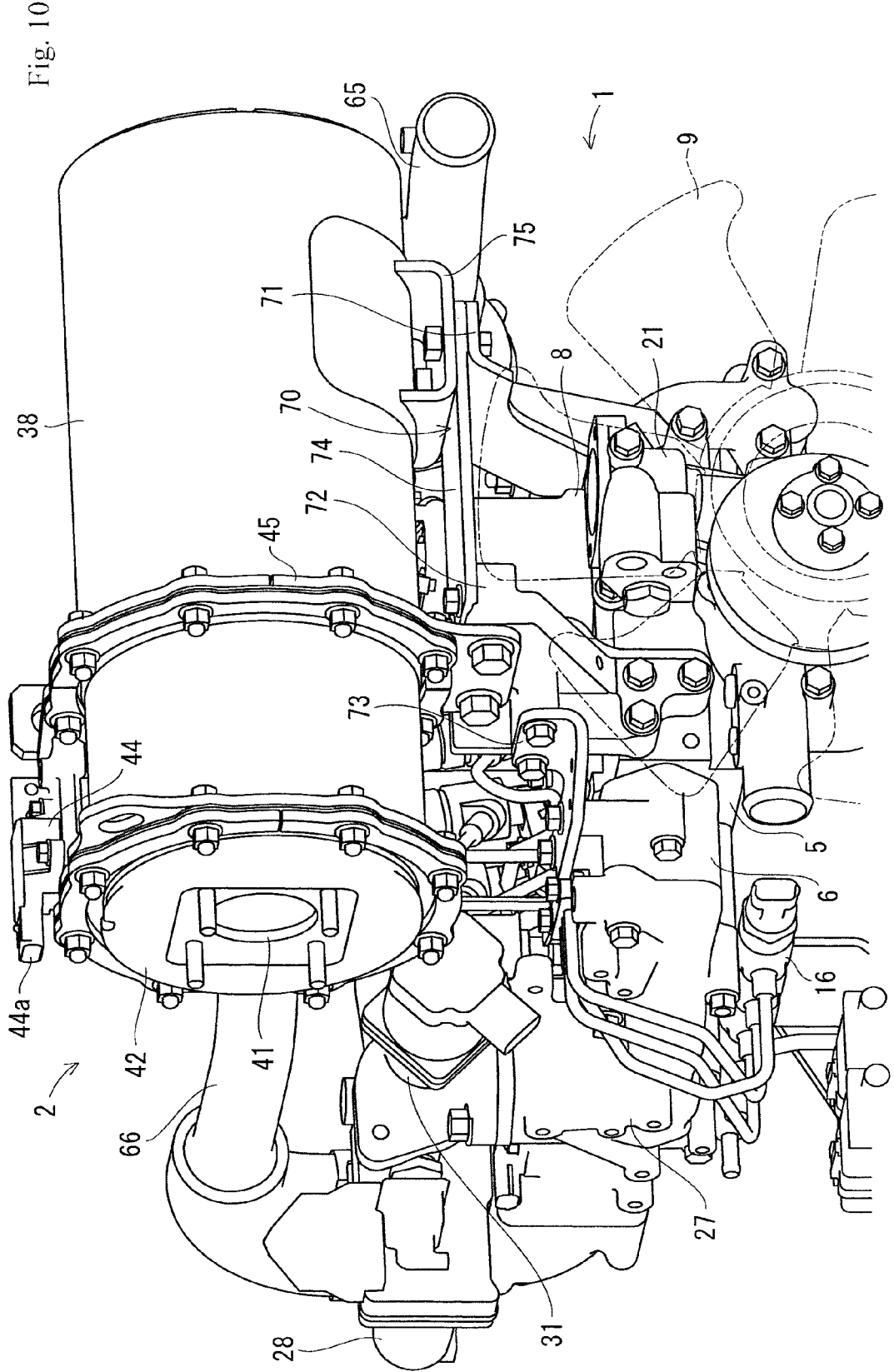
FIG. 10 is an enlarged right front perspective view of the engine and the exhaust gas purifier.
Figure 11:
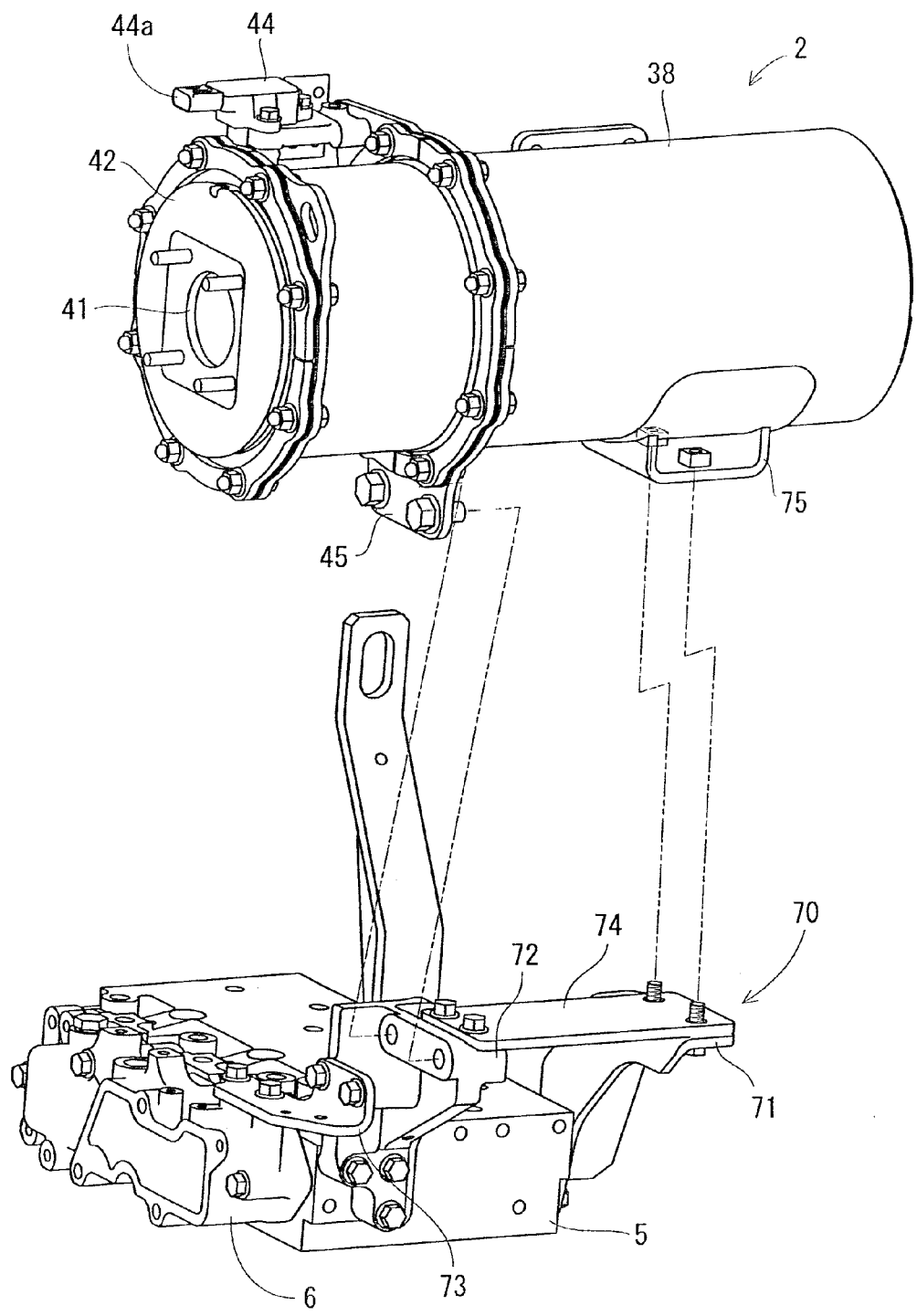
FIG. 11 is an exploded perspective view of the exhaust gas purifier with respect to the engine.
Figure 12:
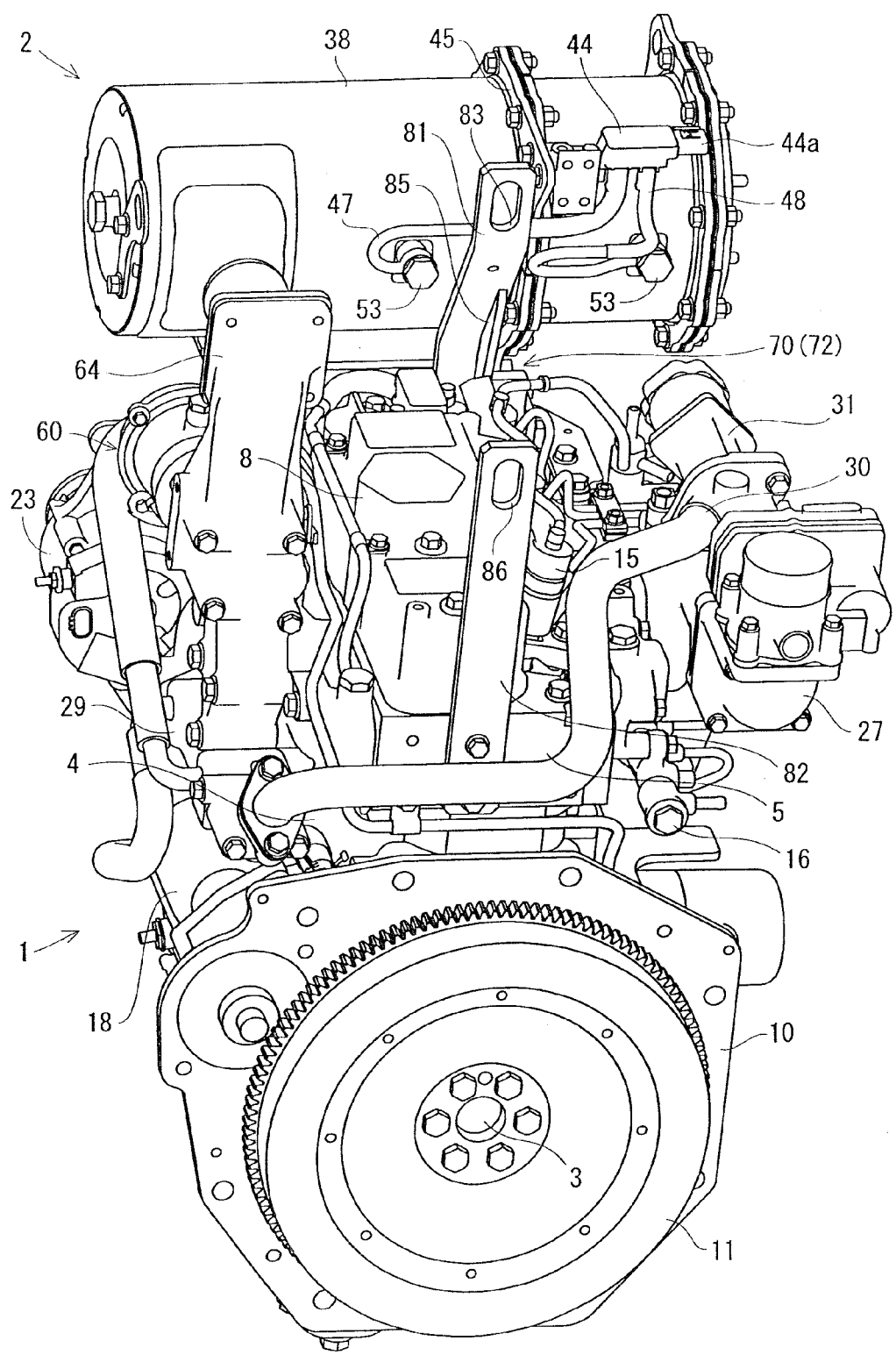
FIG. 12 is a left rear perspective view of the engine from which a supercharge pipe is omitted.
Figure 13:
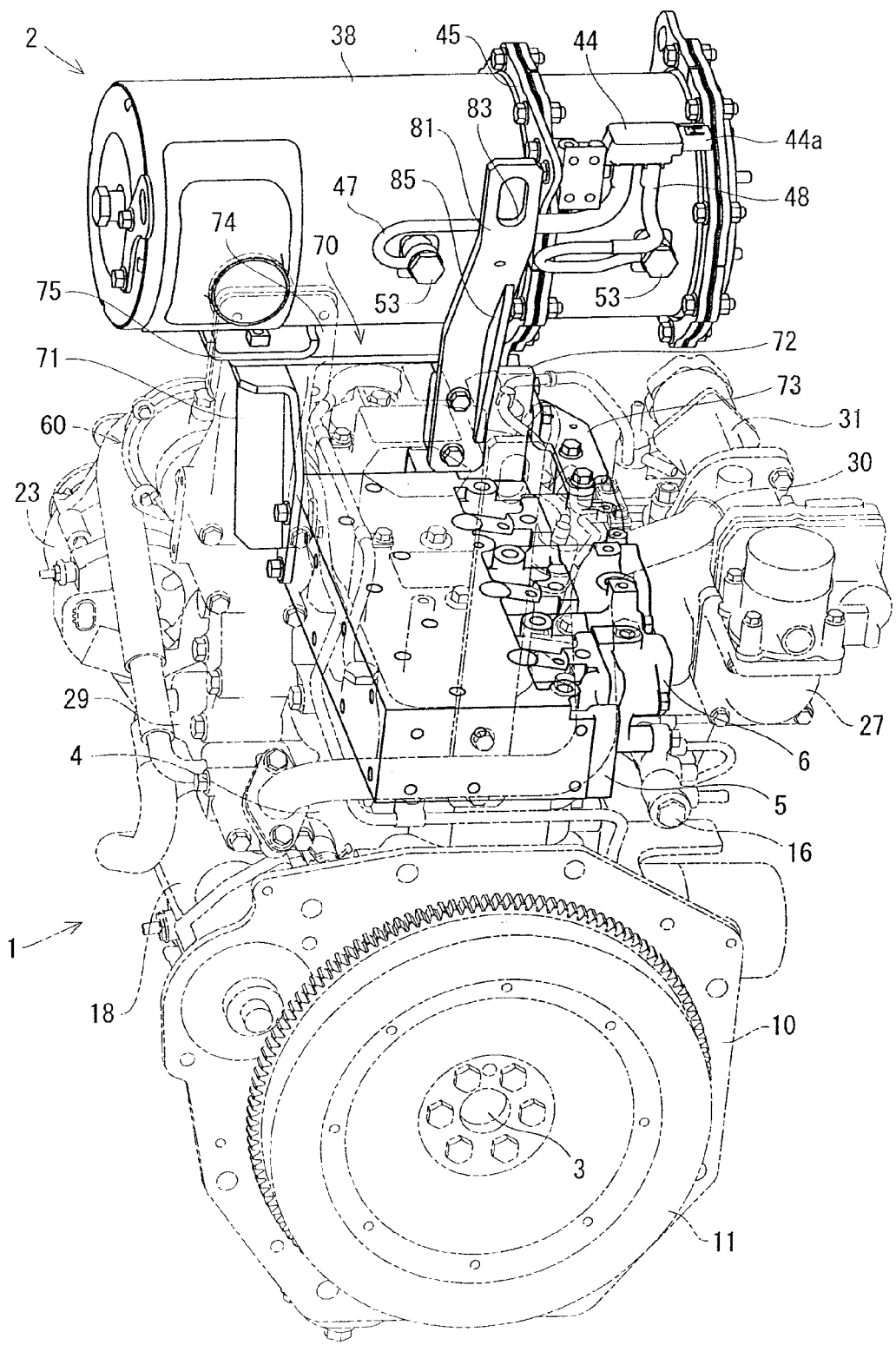
FIG. 13 is an enlarged left rear perspective view illustrating an attachment state of a first hanger with respect to an outlet-side bracket body.
Figure 14:
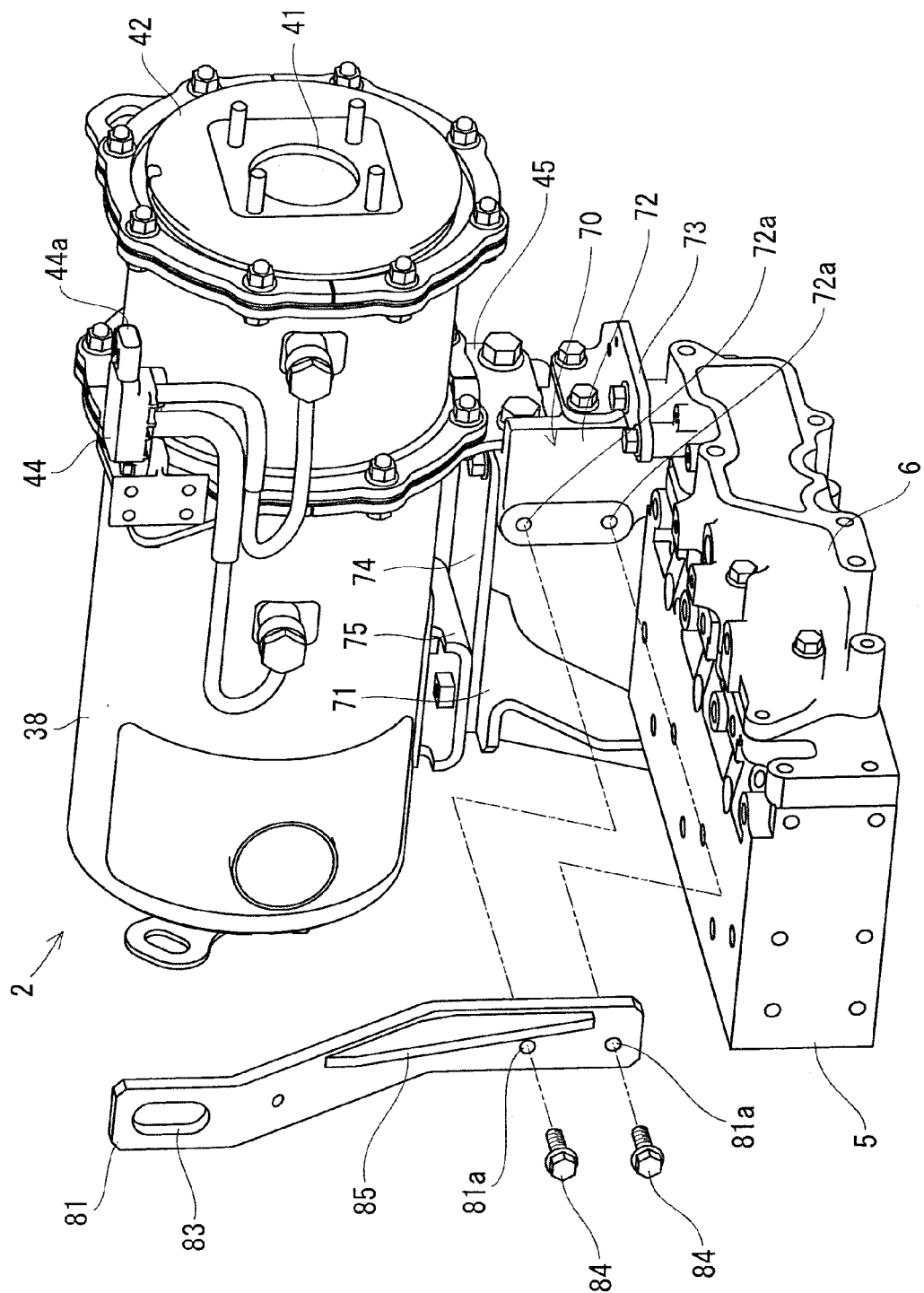
FIG. 14 is an enlarged exploded perspective view illustrating an attachment relationship of the first hanger with respect to the outlet-side bracket body.
Figure 15:
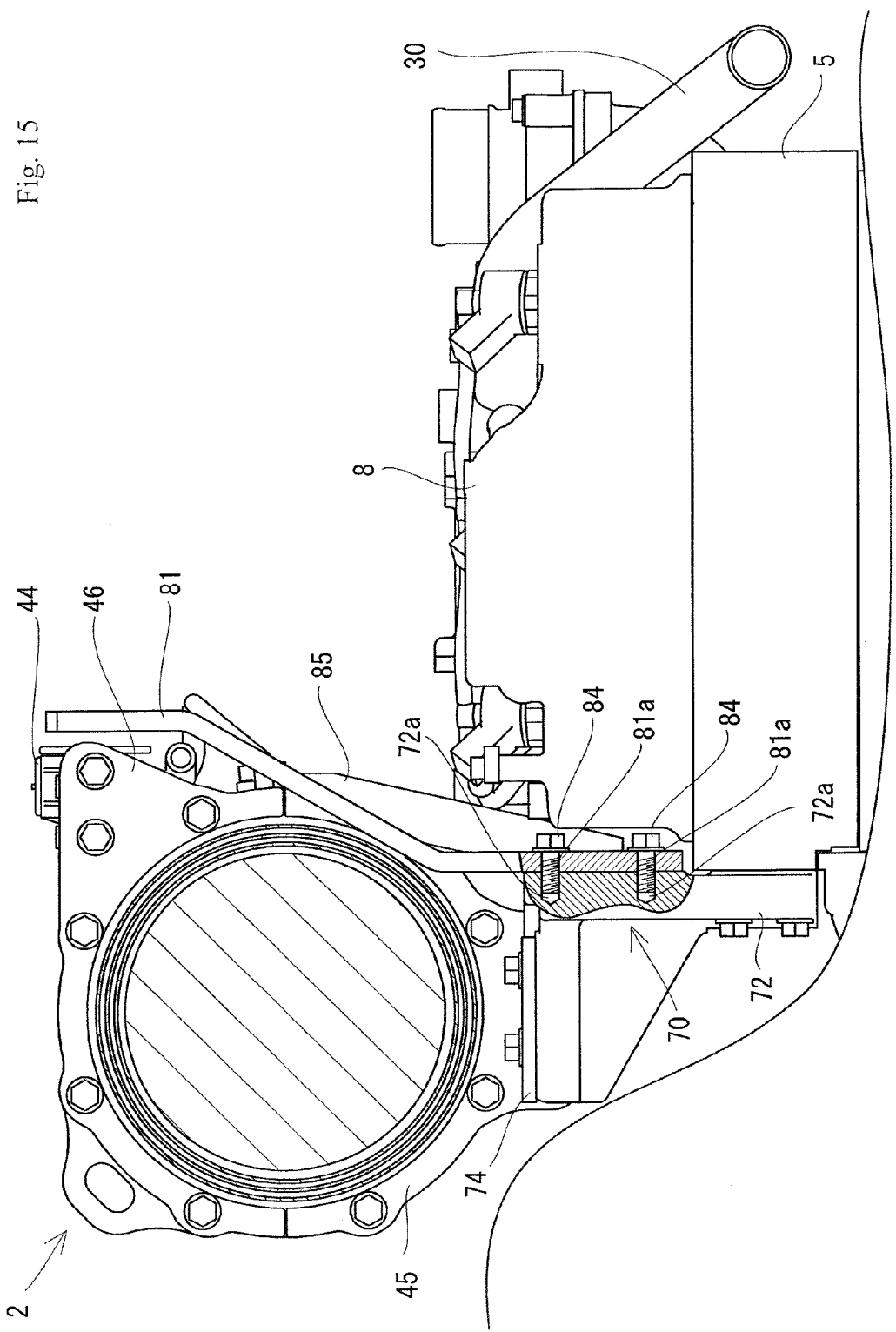
FIG. 15 is a partially cut-away, left side view illustrating a positional relationship of the outlet-side bracket body, the first hanger, and a cylinder head.
Figure 16:
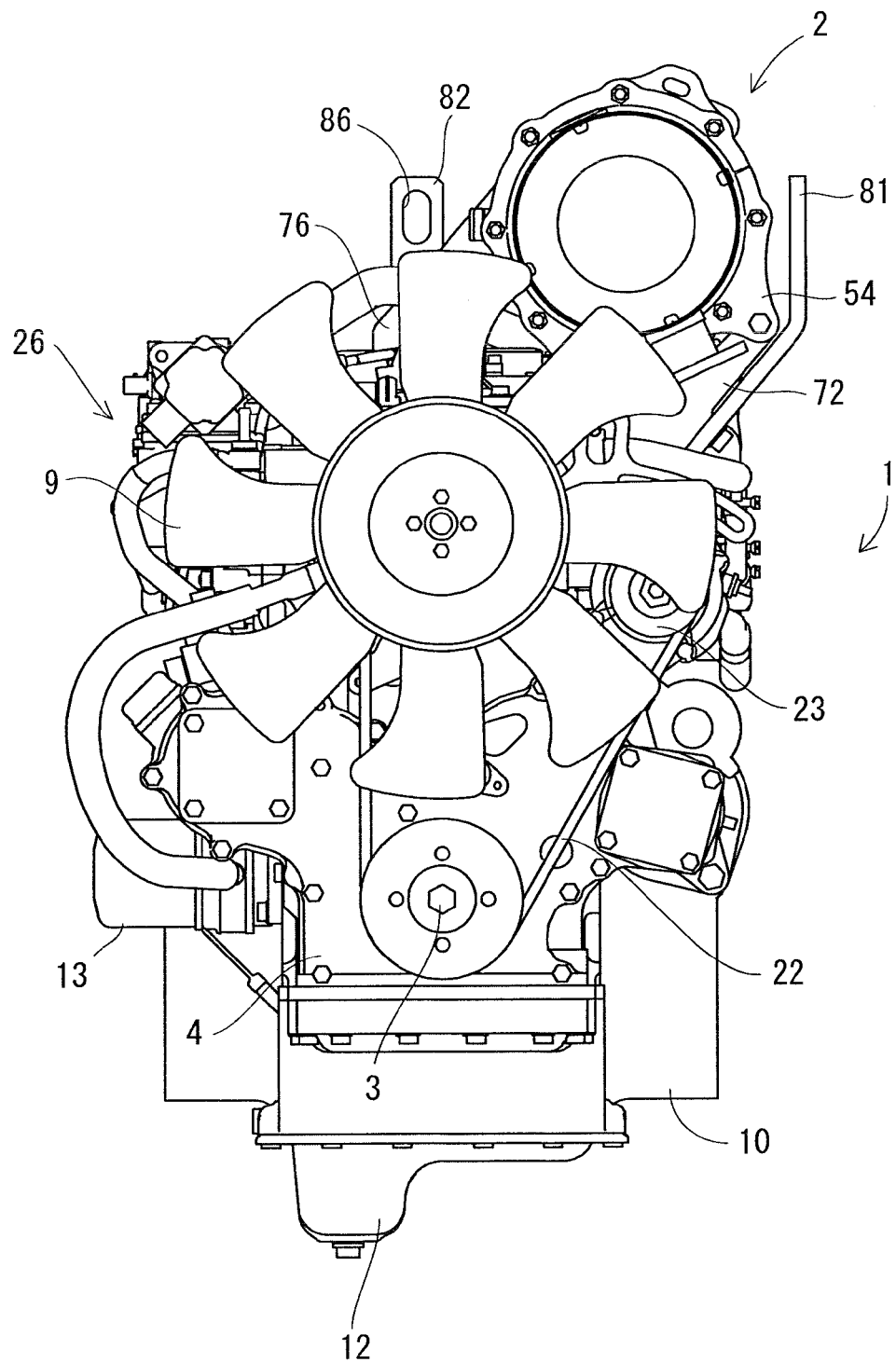
FIG. 16 is a front view of an engine according to a second embodiment.
Figure 17:
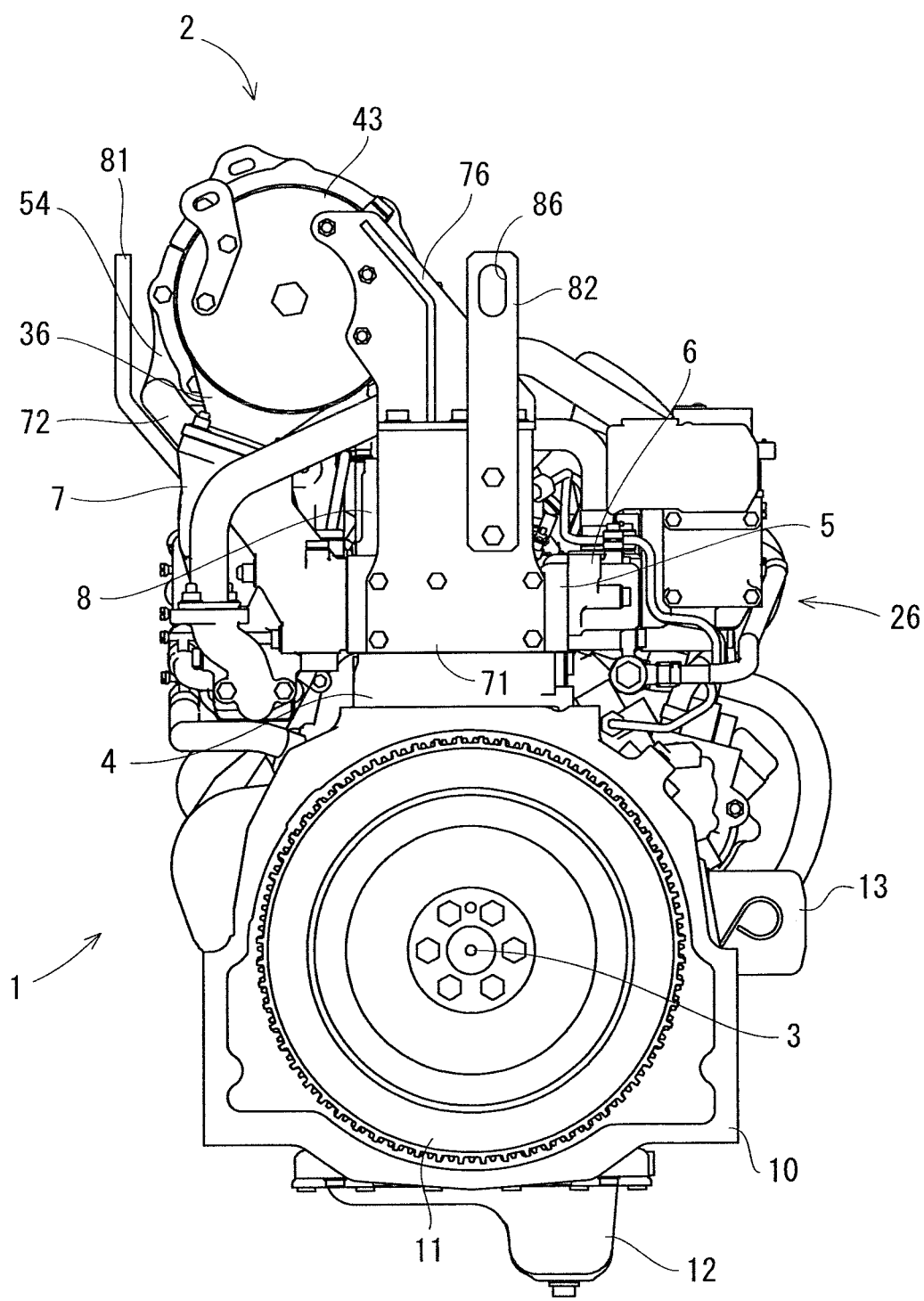
FIG. 17 is a rear view of the engine.
Figure 18:
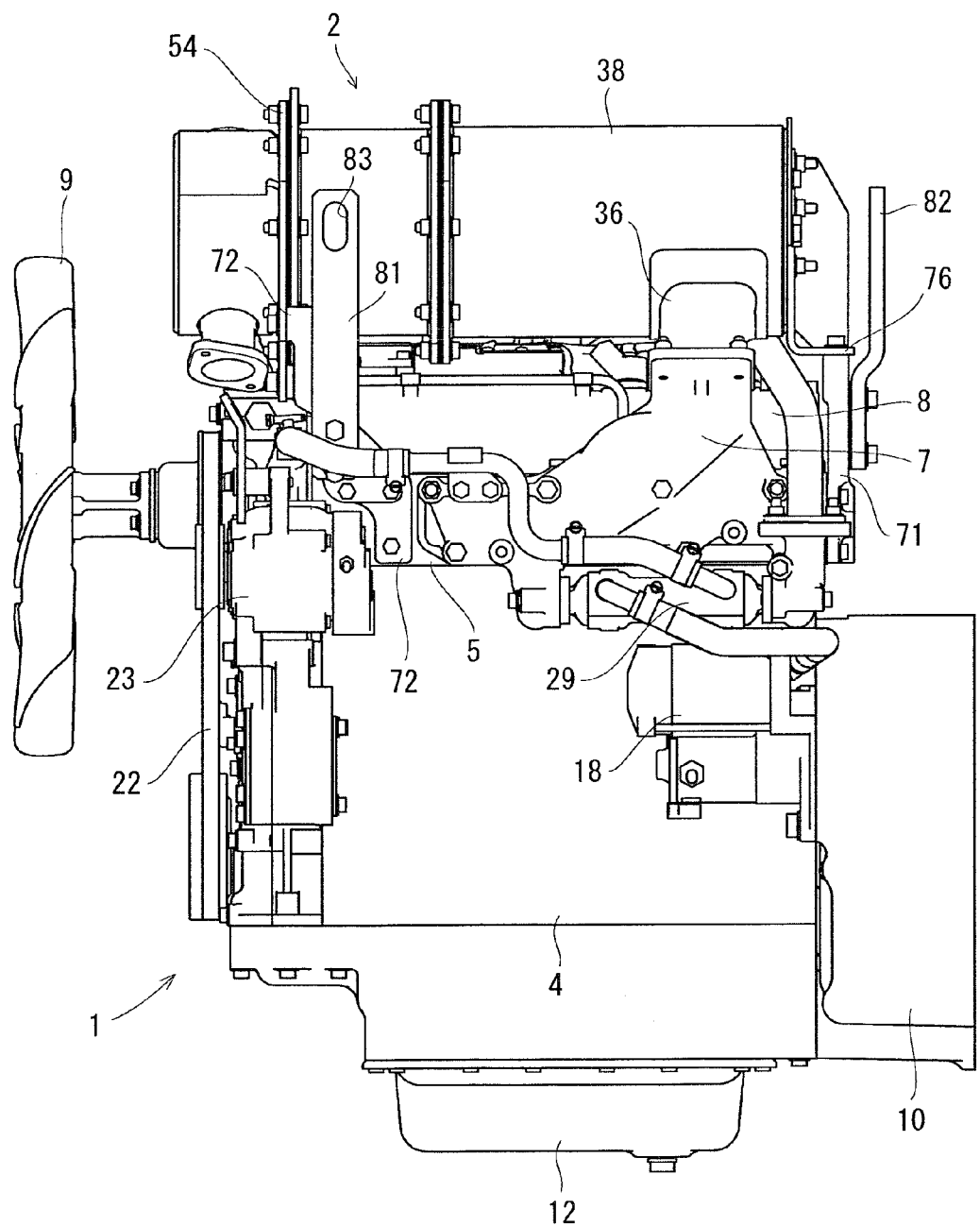
FIG. 18 is a left side view of the engine.
Figure 19:
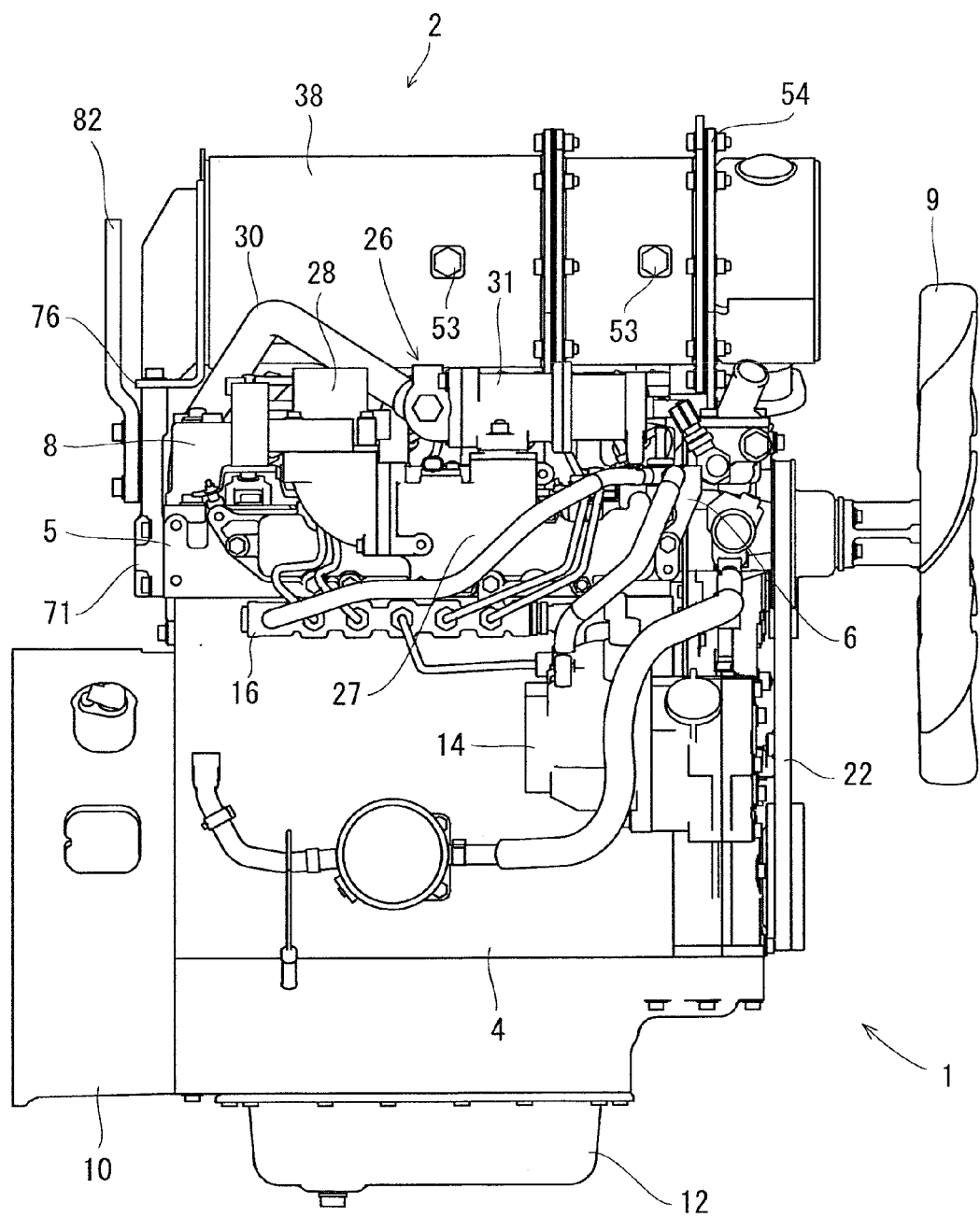
FIG. 19 is a right side view of the engine.
Figure 20:
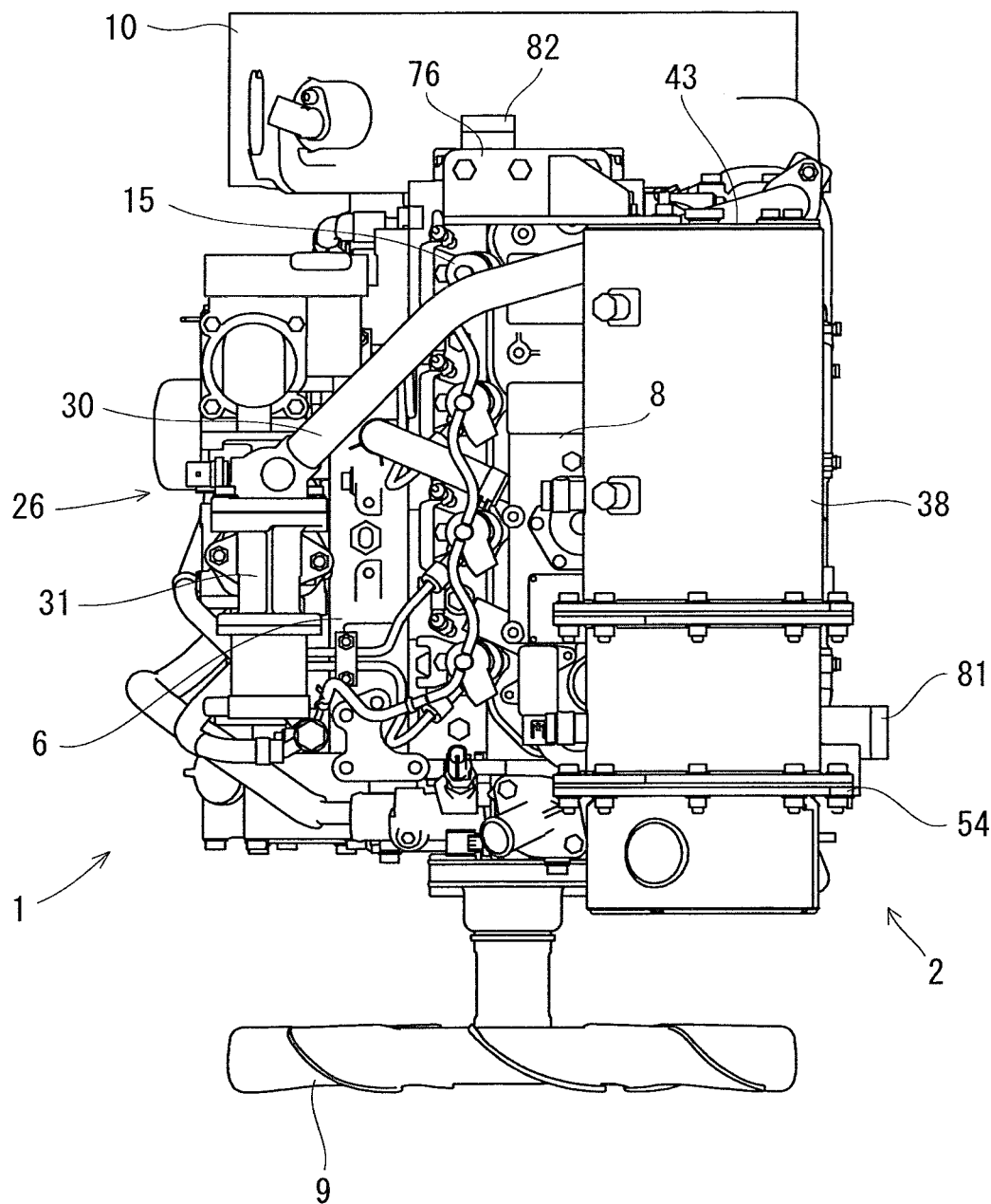
FIG. 20 is a plan view of the engine.
Figure 21:
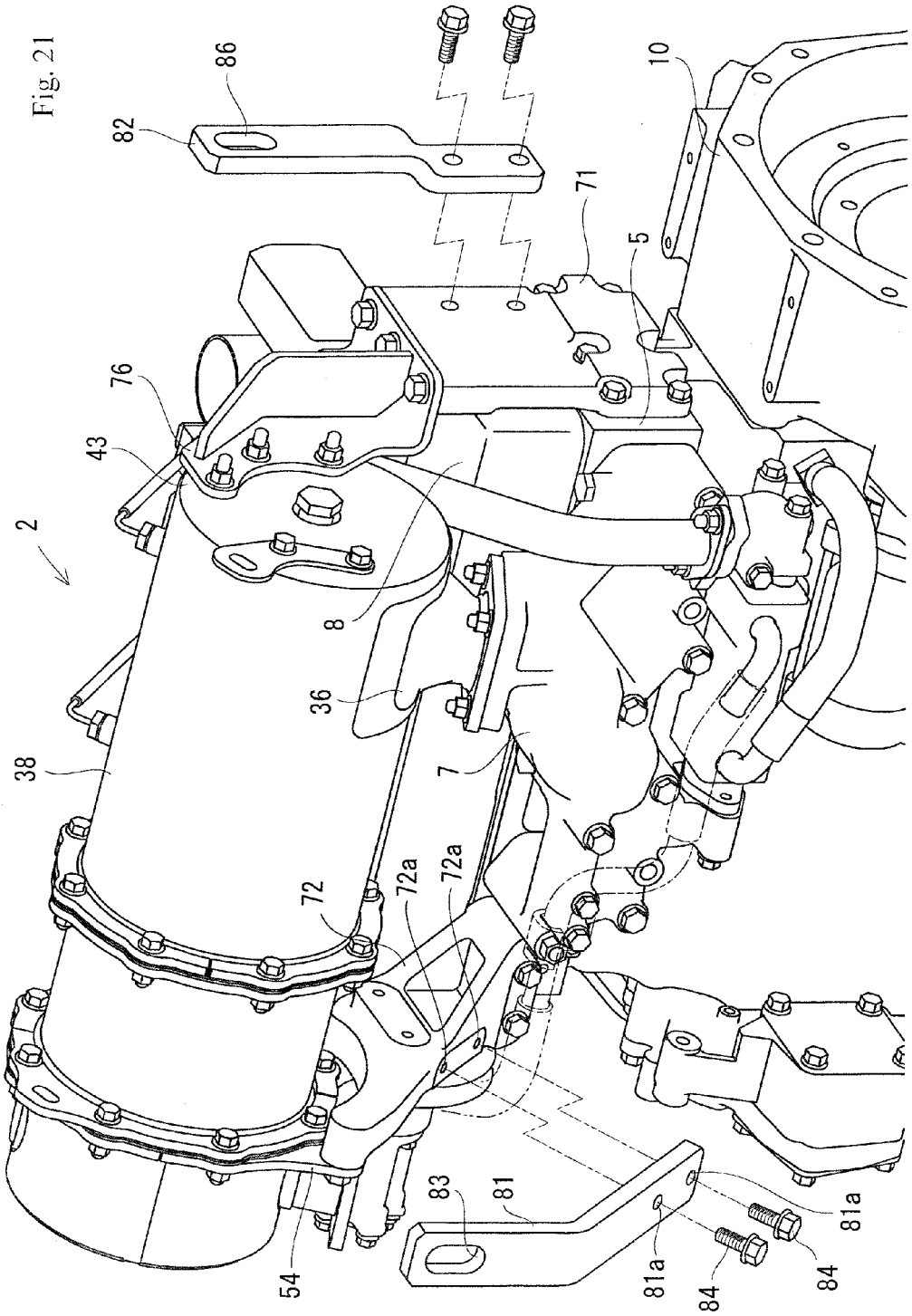
FIG. 21 is an enlarged perspective view illustrating an attachment state of hangers.
Figure 22:
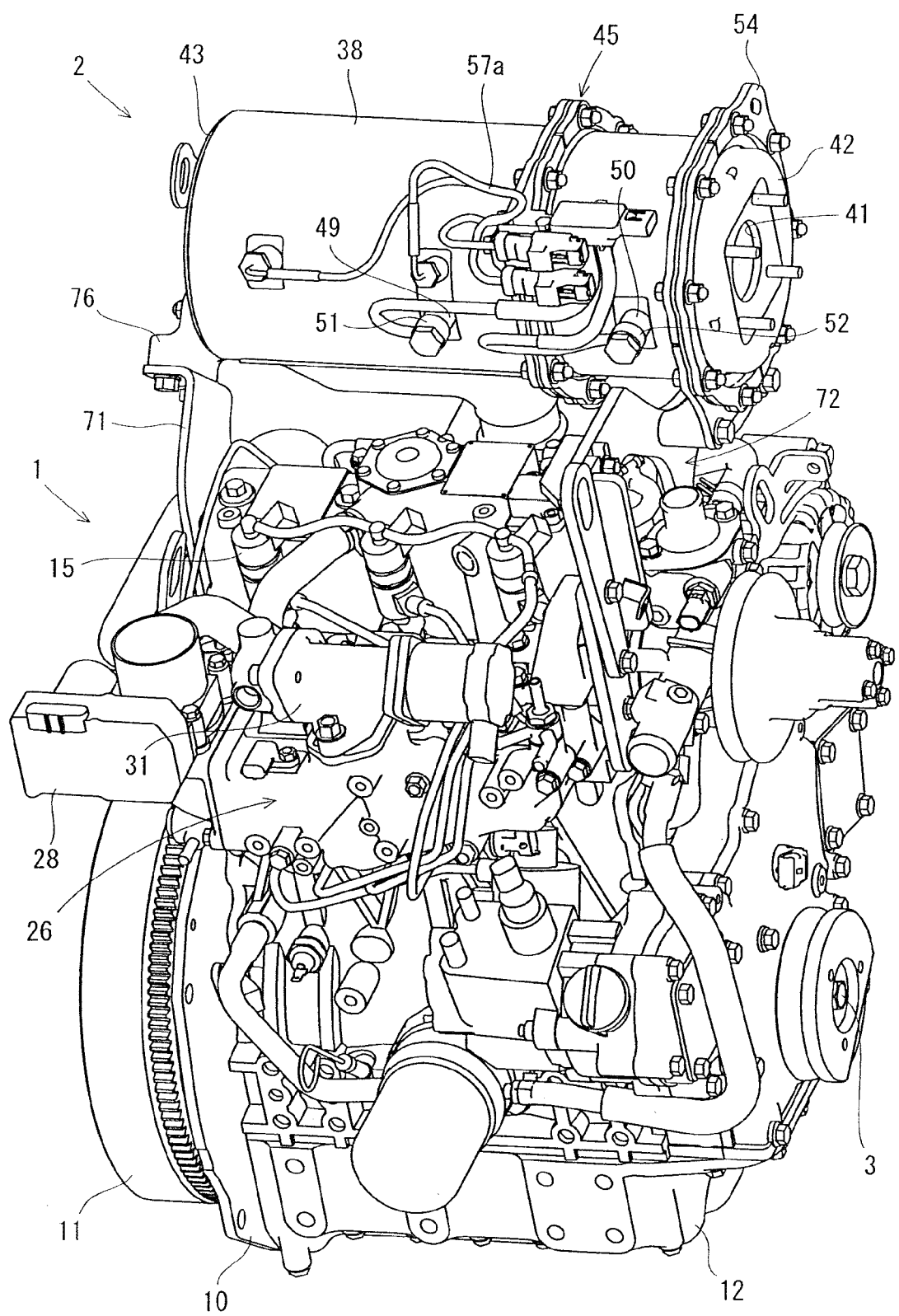
FIG. 22 is an upper-right perspective view of an engine according to a third embodiment.
Figure 23:
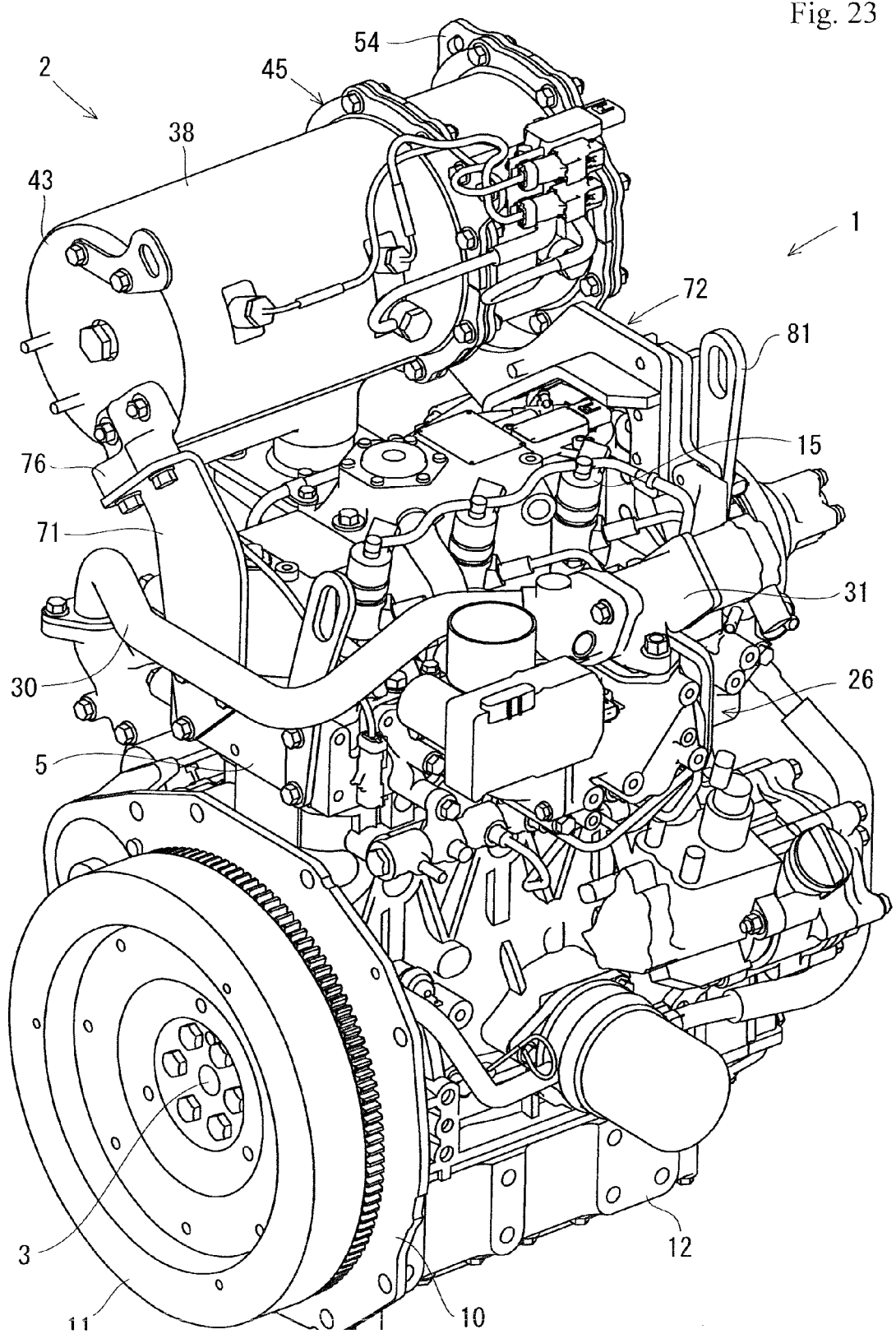
FIG. 23 is a right rear perspective view of the engine.

As shown in FIGS. 9 to 11 in detail, the engine 1 includes an inlet-side bracket body 71 and an outlet-side bracket body 72 to support and secure the exhaust gas purifier 2. In the first embodiment, the inlet-side bracket body 71 is made of sheet metal, and the outlet-side bracket body 72 is made of cast iron. The inlet-side bracket body 71 corresponds to a sheet-metal bracket body, and the outlet-side bracket body 72 corresponds to a cast-iron bracket body. That is, a combination of the inlet-side bracket body 71 and the outlet-side bracket body 72 corresponds to two kinds of bracket bodies. In the first embodiment, as described above, materials of the bracket bodies 71 and 72 are respectively sheet metal and cast iron, and different from each other. Materials of the bracket bodies 71 and 72 should not be limited to cast iron or sheet metal, and may be other materials such as die cast products.

A lower end of the inlet-side bracket body 71 is fastened by bolts to the front portion of the left side surface of the cylinder head 5. A lower end of the outlet-side bracket body 72 is fastened by bolts to the front surface of the cylinder head 5, and also, a vertically middle portion of the outlet-side bracket body 72 is fastened by bolts to the upper surface of the intake manifold 6 through a coupling bracket 73. The coupling bracket 73 is made of sheet metal similarly to the inlet-side bracket body 71, and corresponds to an auxiliary sheet-metal bracket. The inlet-side bracket body 71 and the outlet-side bracket body 72 stand on the front side of the cylinder head 5.

As described above, the lower end of the outlet-side bracket body 72 is fastened to the front surface side of the cylinder head 5 to set a mounting reference position of the exhaust gas purifier 2 with respect to the engine 1 highly accurately. Therefore, although the exhaust gas purifier 2 is heavier than a post-processing device such as a muffler, the exhaust gas purifier 2 is mounted at a predetermined position appropriately. Furthermore, the intake manifold 6 and the outlet-side bracket body 72 are coupled through the coupling bracket 73. Thus, sufficient coupling strength (rigidity) of the outlet-side bracket body 72 with respect to the engine 1 is secured to prevent degradation of and damage to the exhaust gas purifier 2 due to vibration of the engine 1. This improves durability of the exhaust gas purifier 2.

A reinforcement plate 74 is disposed on an upper end of the inlet-side bracket body 71. A distal end portion (right end portion) of the reinforcement plate 74 of the inlet-side bracket body 71 is coupled to an upper end of the outlet-side bracket body 72. That is, the inlet-side bracket body 71 and the outlet-side bracket body 72 are coupled through the reinforcement plate 74 to constitute a single mounting base 70.

A receiving bracket 75 is fastened by bolts to a proximal end portion (left side portion) of the reinforcement plate 74 secured on the upper end of the inlet-side bracket body 71. The receiving bracket 75 is welded on the outer peripheral surface of the purification casing 38 on the exhaust downstream side. The upper end of the outlet-side bracket body 72 is fastened by bolts to the intermediate clamping flange 45 of the purification casing 38. Through the inlet-side bracket body 71 and the outlet-side bracket body 72, which constitute the single mounting base 70, the exhaust gas purifier 2 (purification casing 38) is supported on the cylinder head 5 of the engine 1. Therefore, as compared with the conventional technique of supporting the exhaust gas purifier utilizing the intake and exhaust manifolds, restriction of the arrangement of the exhaust gas purifier 2 is lessened. This improves a degree of freedom of the arrangement of the exhaust gas purifier 1 above the engine 1. Through the single mounting base 70 made up of the inlet-side bracket body 71 and the outlet-side bracket body 72, the exhaust gas purifier 2 is mounted above the engine 1 while saving the mounting space and securing sufficient support strength.

Next, referring to FIGS. 12 to 15, hangers 81 and 82 used for mounting and dismounting the engine 1 on and from the working machine and an attachment configuration of the hangers 81 and 82 will be described. The engine 1 in the first embodiment includes a pair of hangers 81 and 82. In order to lift the engine 1 with the exhaust gas purifier 2, which has a large weight, in a stable posture (in a balanced manner), the pair of hangers 81 and 82 are separately disposed on both sides of the engine 1 in a direction intersecting the output shaft 3. The hangers 81 and 82 in the first embodiment are separately disposed on the front side and the rear side of the cylinder head 5 of the engine 1. Of the pair of hangers 81 and 82, the second hanger 82 is made of a longitudinal metal plate. A through hanging hole 86 through which, for example, wire rope is inserted is formed in an upper end of the second hanger 82. A lower end of the second hanger 82 is fastened by bolts to the rear surface of the cylinder head 5.

The first hanger 81 is made of a metal plate bent in a crank shape. A through hanging hole 83 through which, for example, wire rope is inserted is formed in an upper end of the first hanger 81. A lower end of the first hanger 81 is fastened by bolts to the mounting base 70. In this embodiment, bolt holes 81a are formed in the lower end of the first hanger 81. The die-cast outlet-side bracket body 72 constituting the mounting base 70 has an upper portion that is more on the upper side than the vertically middle portion. This upper portion of the outlet-side bracket body 72 protrudes more upwardly than the upper surface of the cylinder head 5, Bolt holes 72a serving as a fastening portion are formed in an outer surface (rear surface) of the upper portion of the outlet-side bracket body 72 that faces the cylinder head 5 of the engine 1.

The lower end of the first hanger 81 is disposed over the rear surface of the upper portion of the outlet-side bracket body 72. Fastening bolts 84 are tightened in the bolt holes 81a of the first hanger 81 and the bolt holes 72a of the outlet-side bracket body 72 in an outward direction from the head cover 8 toward the cooling fan 9. Thus, the first hanger 81 is detachably secured to the outlet-side bracket body 72. Since the bolt holes 72a serving as the fastening portion are formed in the rear surface of the upper portion of the outlet-side bracket body 72 in this manner, the fastening bolts 84 for fastening the first hanger 81 are readily tightened.

The rear surface of the upper portion of the outlet-side bracket body 72 is located below the exhaust gas purifier 2 as if to hide behind the exhaust gas purifier 2 in a plan view.

The first hanger 81 has the crank shape. The lower end of the first hanger 81 is fastened to the rear surface of the upper portion of the outlet-side bracket body 72 by the bolts 84. The first hanger 81 is bent to extend along the outer periphery of the exhaust gas purifier 2 to avoid interference with the exhaust gas purifier 2. The upper end of the first hanger 81 is extended upwardly. Therefore, the upper end of the first hanger 81 is closer to the center of the engine 1 than the lower end of the first hanger 81 is, and the upper end of the first hanger 81 is disposed over the cylinder head 5.

With this configuration, the outlet-side bracket body 72, which is a highly rigid component to support the exhaust gas purifier 2, is also used for the fastening portion with respect to the first hanger 81. This reduces the number of components, and at the same time, the first hanger 81 is firmly fastened to the engine 1 (the coupling strength of the first hanger 81 with respect to the engine 1 is secured). Moreover, while balancing the whole engine 1 at the time of lifting and avoiding interference between the exhaust gas purifier 2 and the first hanger 81, the first hanger 81 is assembled with the engine 1 in reduced space.

A reinforcement rib 85 is welded on a bent inner surface of a lower bent portion of the first hanger 81. The rib effect due to the existence of the reinforcement rib 85 improves rigidity of the first hanger 81. It should be noted that the strength of the first hanger 81 is set to be smaller than the strength of the outlet-side bracket body 72. When an excessively large external force is exerted at the time of, for example, lifting the engine 1, plastic deformation or breakage of the first hanger 81 may be induced faster than the outlet-side bracket body 72. Thus, deformation of the outlet-side bracket body 72 by lifting the engine 1 is prevented. As a result, exertion of external force on the exhaust gas purifier 2 is minimized at the time of lifting the engine 1.

In this embodiment, the outlet-side bracket body 72 and the inlet-side bracket body 71 are coupled to constitute the single mounting base 70. The lower end of the first hanger 81 is fastened to the outlet-side bracket body 72. Therefore, through the mounting base 70 made up of the outlet-side bracket body 72 and the inlet-side bracket body 71, the exhaust gas purifier 2 is mounted on the engine 1 while saving space and securing sufficient support strength. Furthermore, coupling with the inlet-side bracket body 71 complements strength of the outlet-side bracket body 72, and more reliably prevents external force from being exerted on the exhaust gas purifier 2 at the time of lifting the engine 1.

In the above-described configuration, when the engine 1 is mounted on and dismounted from the working machine, wire rope, for example, is inserted through the through hanging holes 83 and 86 formed in the first and second hangers 81 and 82, and the wire rope is engaged with such a component as a hook of a chain block. Thus, the engine 1 is lifted.

Next, referring to FIGS. 16 to 21, description will be made on a mounting configuration of an exhaust gas purifier 2 with respect to an engine 1 in a second embodiment. It should be noted that in the second embodiment and the following embodiment, components having the same configurations and effects as in the first embodiment will be denoted by the same reference numerals and will not be elaborated here.

The exhaust gas purifier 2 in the second embodiment is disposed on an upper side of the engine 1 above the exhaust manifold 7. In this case, the exhaust gas purifier 2 is set in such a posture that the longitudinal direction of the exhaust gas purifier 2 extends parallel to the output shaft 3 of the engine 1. The purification inlet pipe 36 of the exhaust gas purifier 2 (purification casing 38) is coupled to an outlet portion of the exhaust manifold 7.

An outlet-side bracket body 72 in the second embodiment is disposed on a front portion of the left side surface (the left side surface on the cooling fan 9 side) of the cylinder head 5 and next to the exhaust manifold 7. A lower end of the outlet-side bracket body 72 is fastened by bolts to the front portion of the left side surface of the cylinder head 5. An upper end of the outlet-side bracket body 72 is fastened by bolts to an outlet clamping flange 54 of the purification casing 38.

An inlet-side bracket body 71 in the second embodiment is located on the rear side of the cylinder head 5 (above the mounting plate 10). A lower end of the inlet-side bracket body 71 is fastened by bolts to the rear surface of the cylinder head 5. An extension bracket 76 is fastened by bolts to an upper end of the inlet-side bracket body 71. Through bolts and nuts, a distal end of the extension bracket is fastened to an inlet-side lid member 43 to cover an end portion of the purification casing 38 on the exhaust upstream side.

Hangers 81 and 82 in the second embodiment are disposed separately on the left side and the rear side of the cylinder head 5 of the engine 1. Of the pair of hangers 81 and 82, the second hanger 82 is made of a metal plate having a crank shape. A through hanging hole 86 through which, for example, wire rope is inserted is formed in an upper end of the second hanger 82. A lower end of the second hanger 82 is fastened by bolts to an outer surface of the inlet-side bracket body 71.

The first hanger 81 is made of a metal plate having a cross-section slightly folded horizontally in the middle. A through hanging hole 83 through which, for example, wire rope is inserted is formed in an upper end of the first hanger 82. A lower end of the first hanger 81 is fastened by bolts to an outer surface of an upper portion of the outlet-side bracket body 72 that is on a side opposite to the cylinder head 5 side (an upper portion of the left side surface of the outlet-side bracket body). In the second embodiment, bolt holes 81a are formed in a lower end of the first hanger 81. Bolt holes 72a serving as a fastening portion are formed in the upper portion of the left side surface of the outlet-side bracket body 72. The lower end of the first hanger 81 is disposed over the upper portion of the left side surface of the outlet-side bracket body 72. Fastening bolts 84 are tightened in the bolt holes 81a of the first hanger 81 and the bolt holes 72a of the outlet-side bracket body 72 in an inward direction toward the cylinder head 5. Thus, the first hanger 81 is detachably secured to the outlet-side bracket body 72.

The upper portion of the left side surface of the outlet-side bracket body 72 is located below the exhaust gas purifier 2 as if to hide behind the exhaust gas purifier 2 in a plan view. Therefore, the first hanger 81 has a cross-section slightly folded horizontally in the middle, and the lower end of the first hanger 81 is fastened by bolts to the upper portion of the left side surface of the outlet-side bracket body 72. The first hanger 81 is bent to extend along the outer periphery of the exhaust gas purifier 2 to avoid interference with the exhaust gas purifier 2. The upper end of the first hanger 81 is extended upwardly.

When the configuration of the second embodiment is employed, the same effect as the first embodiment is obtained. Specifically, the outlet-side bracket body 72, which is a highly rigid component to support the exhaust gas purifier 2, is also used for the fastening portion with respect to the first hanger 81. This reduces the number of components, and at the same time, the first hanger 81 is firmly fastened to the engine 1 (the coupling strength of the first hanger 81 with respect to the engine 1 is secured). Moreover, while balancing the whole engine 1 at the time of lifting and avoiding interference between the exhaust gas purifier 2 and the first hanger 81, the first hanger 81 is assembled with the engine 1 in reduced space.

Next, referring to FIGS. 22 to 32, description will be made on a mounting configuration of the exhaust gas purifier 2 with respect to the engine 1 in a third embodiment. The exhaust gas purifier 2 in the third embodiment is also disposed on an upper side of the engine 1 above the exhaust manifold 7. In this case, the exhaust gas purifier 2 is set in such a posture that the longitudinal direction of the exhaust gas purifier 2 extends parallel to the output shaft 3 of the engine 1. The exhaust gas inflow side of the purification inlet pipe 36 of the purification casing 38 is fastened to an outlet portion of the exhaust manifold 7. Exhaust gas of the exhaust manifold 7 is supplied to the exhaust gas purifier 2 through the purification inlet pipe 36. The exhaust manifold 7 also serves as a casing support body to support the exhaust gas purifier 2. In this case, the exhaust manifold 7 supports a middle portion of the purification casing 38 in the longitudinal direction through the purification inlet pipe 36.

Figure 24:
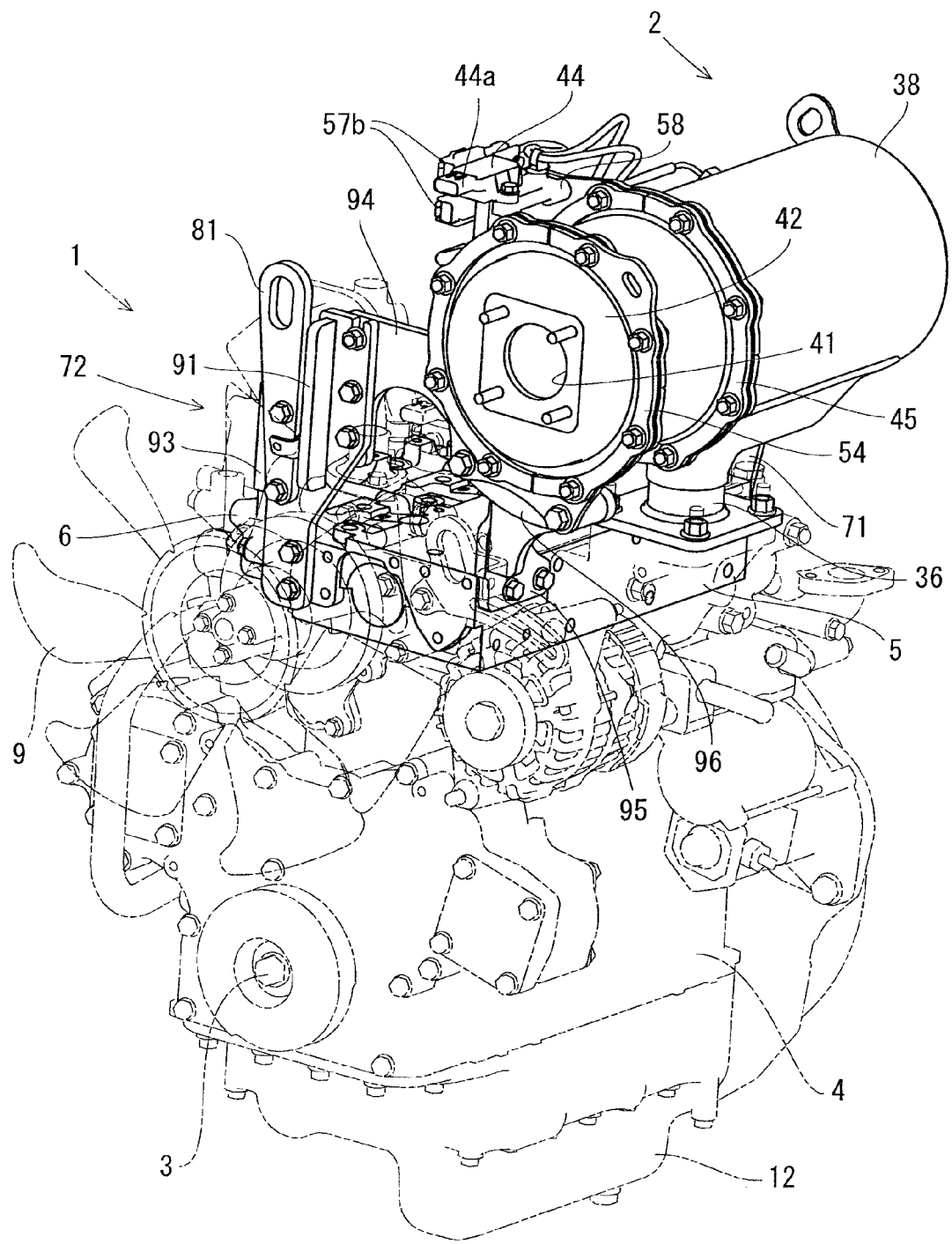
FIG. 24 is an upper-left front perspective view illustrating a positional relationship between the cylinder head and the exhaust gas purifier.
Figure 25:
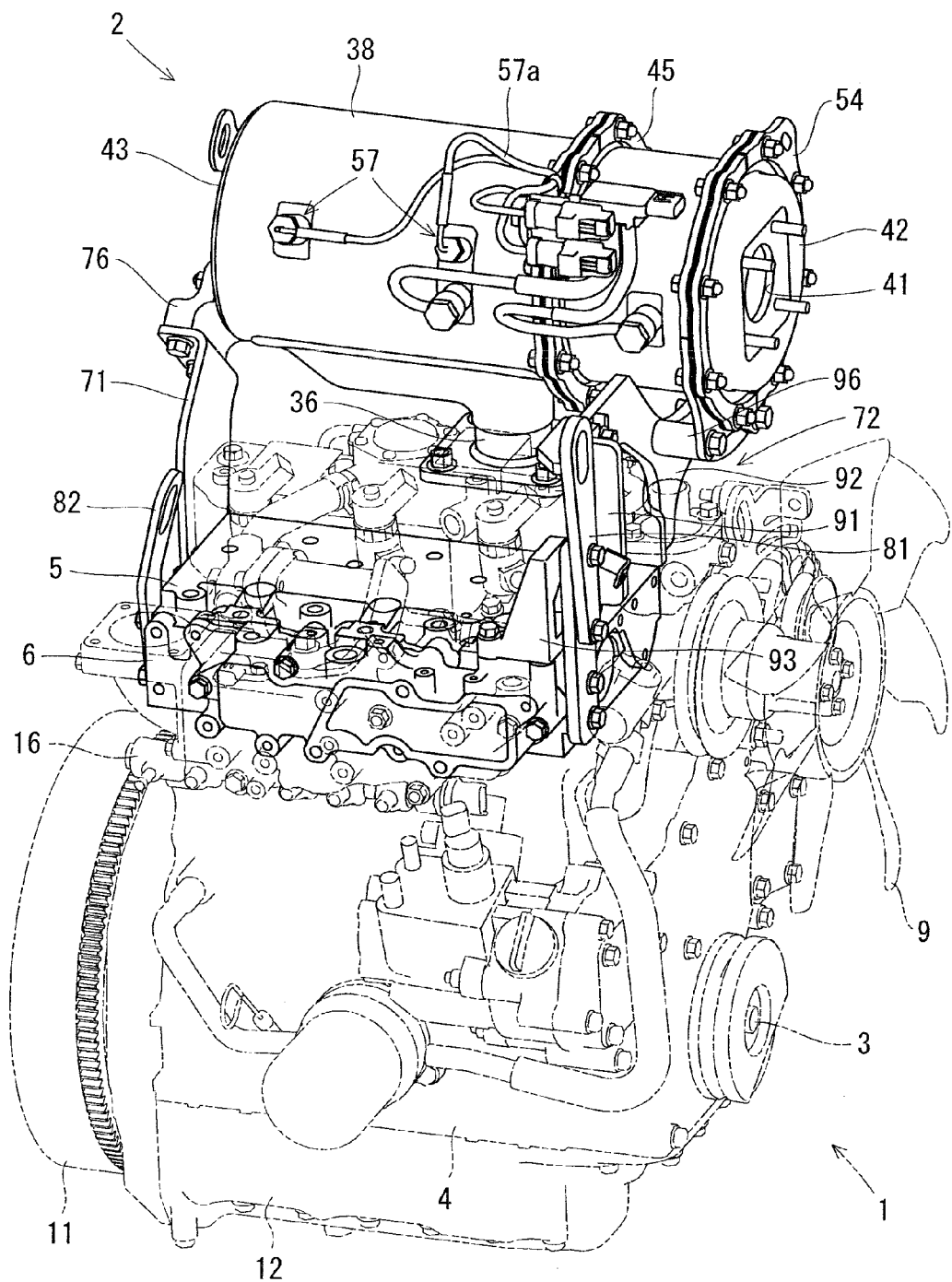
FIG. 25 is an upper-right perspective view illustrating the positional relationship between the cylinder head and the exhaust gas purifier.
Figure 26:
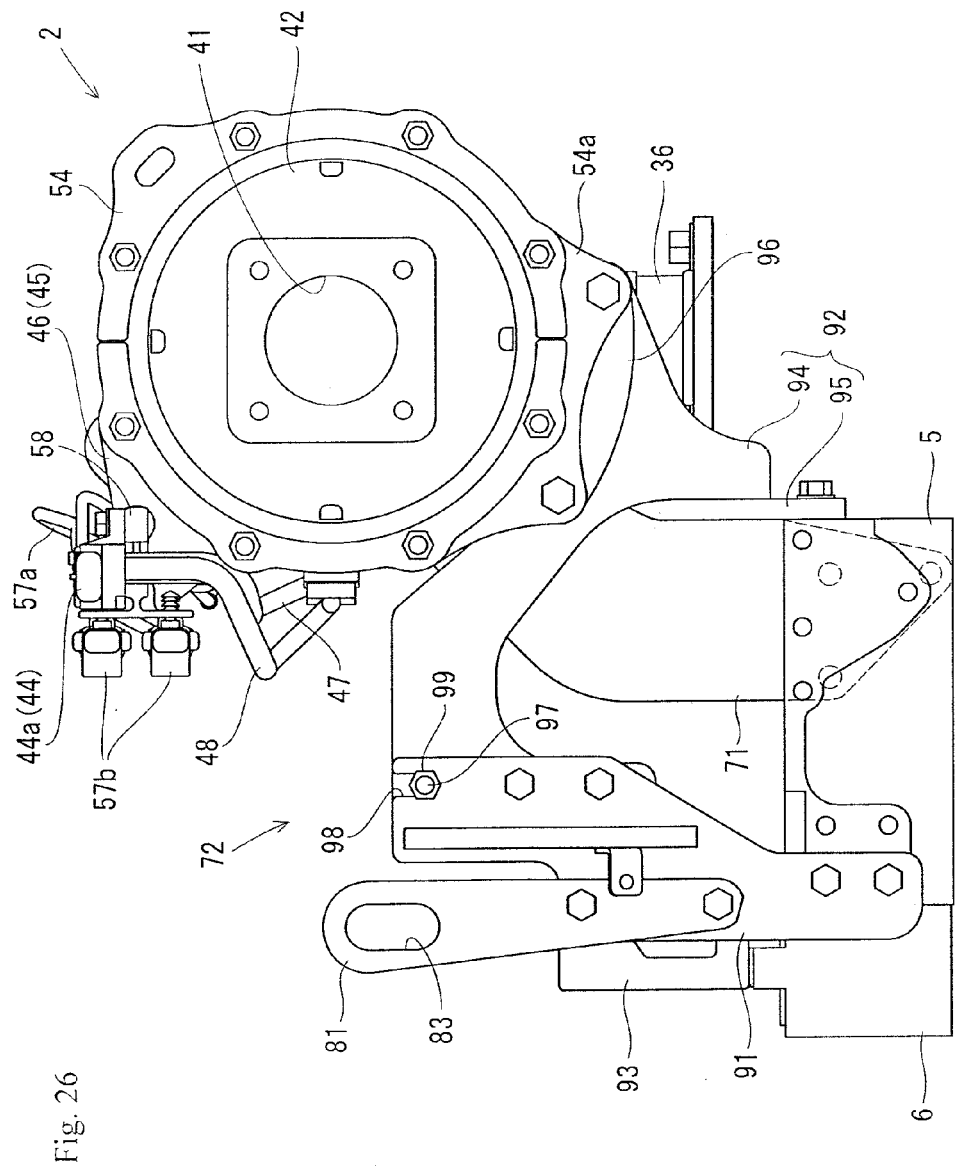
FIG. 26 is an enlarged front view illustrating an attachment state of bracket bodies and the exhaust gas purifier with respect to the cylinder head.
Figure 27:
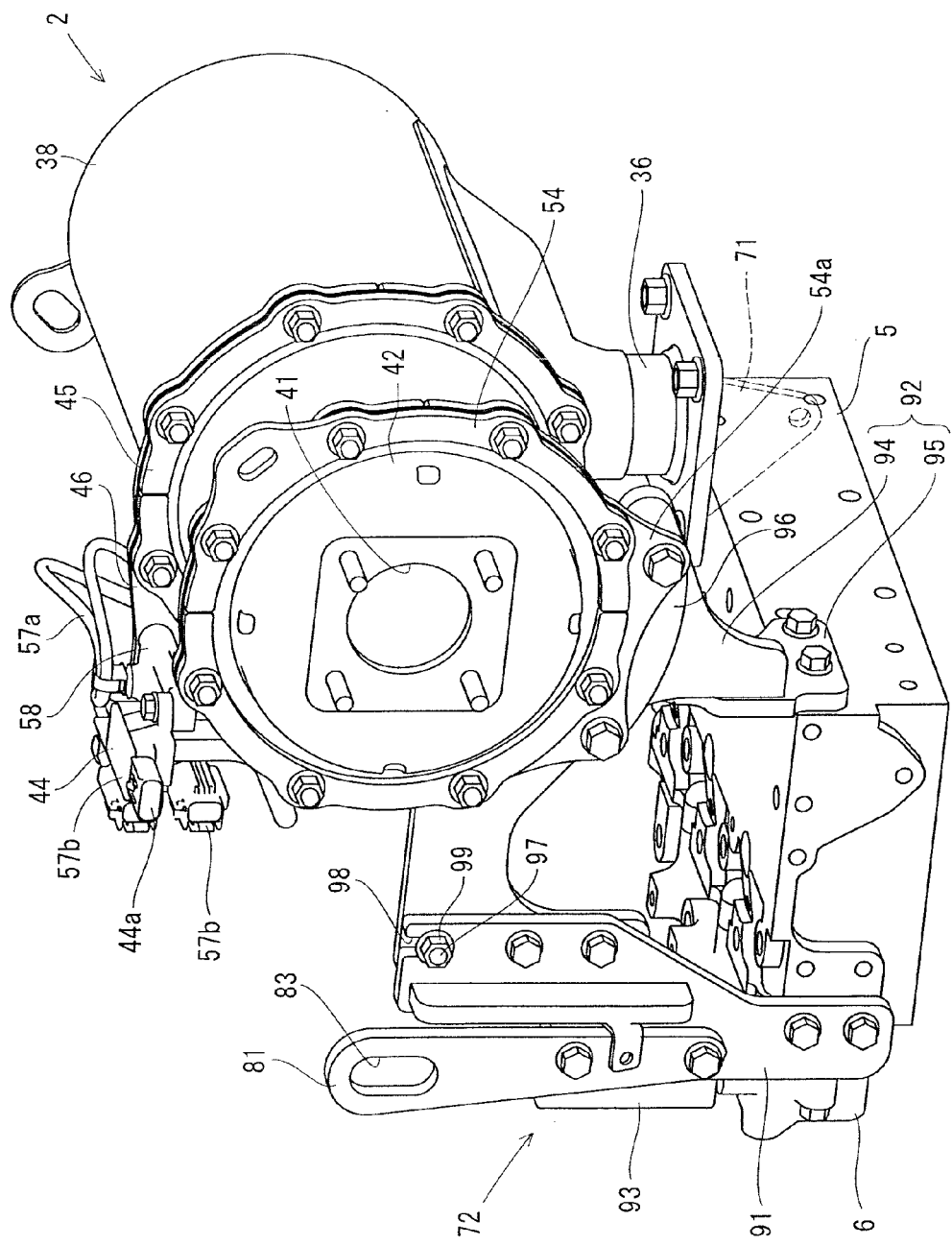
FIG. 27 is an enlarged left front perspective view illustrating the attachment state of the bracket bodies and the exhaust gas purifier with respect to the cylinder head.
Figure 28:
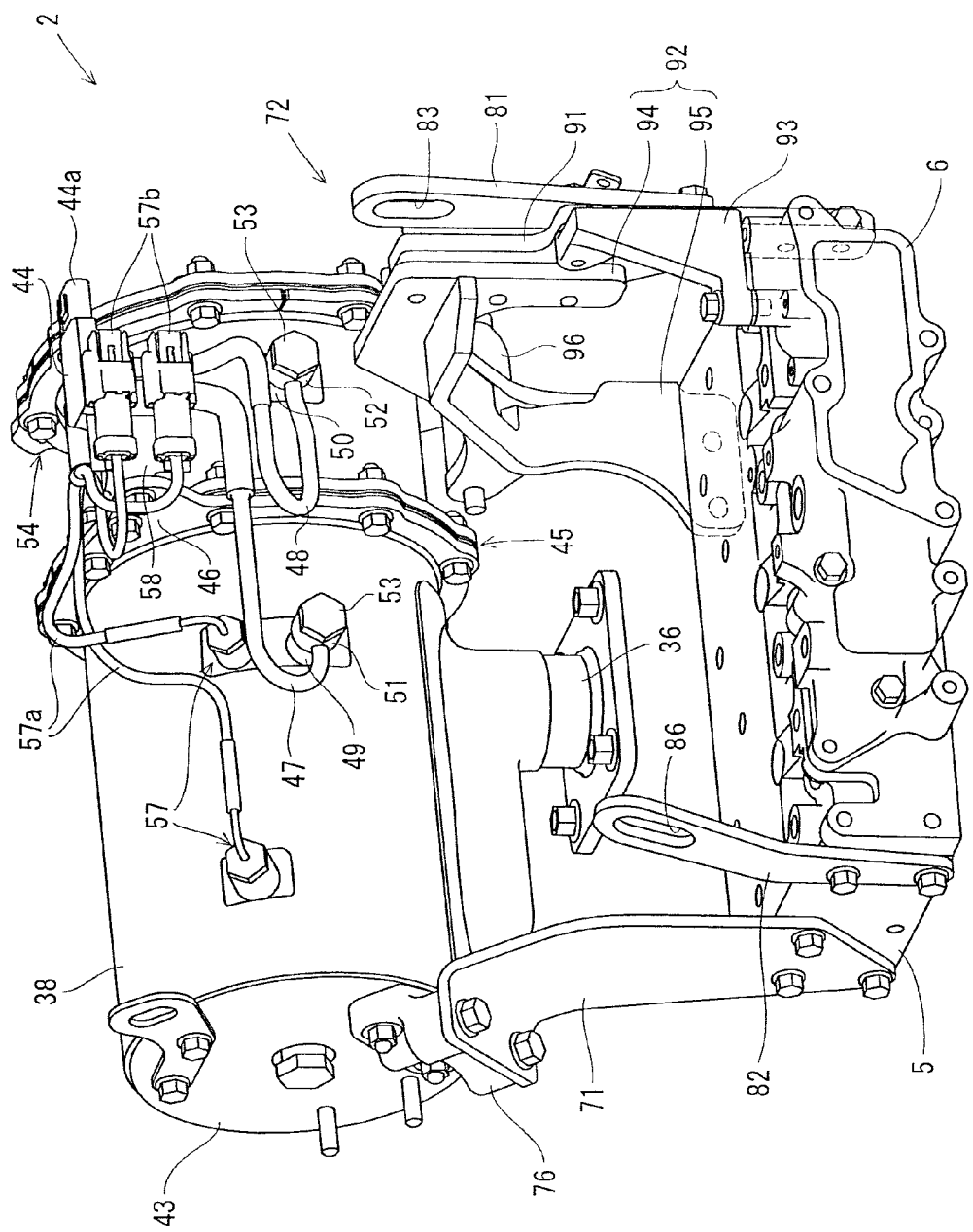
FIG. 28 is an enlarged right rear perspective view illustrating the attachment state of the bracket bodies and the exhaust gas purifier with respect to the cylinder head.
Figure 29:
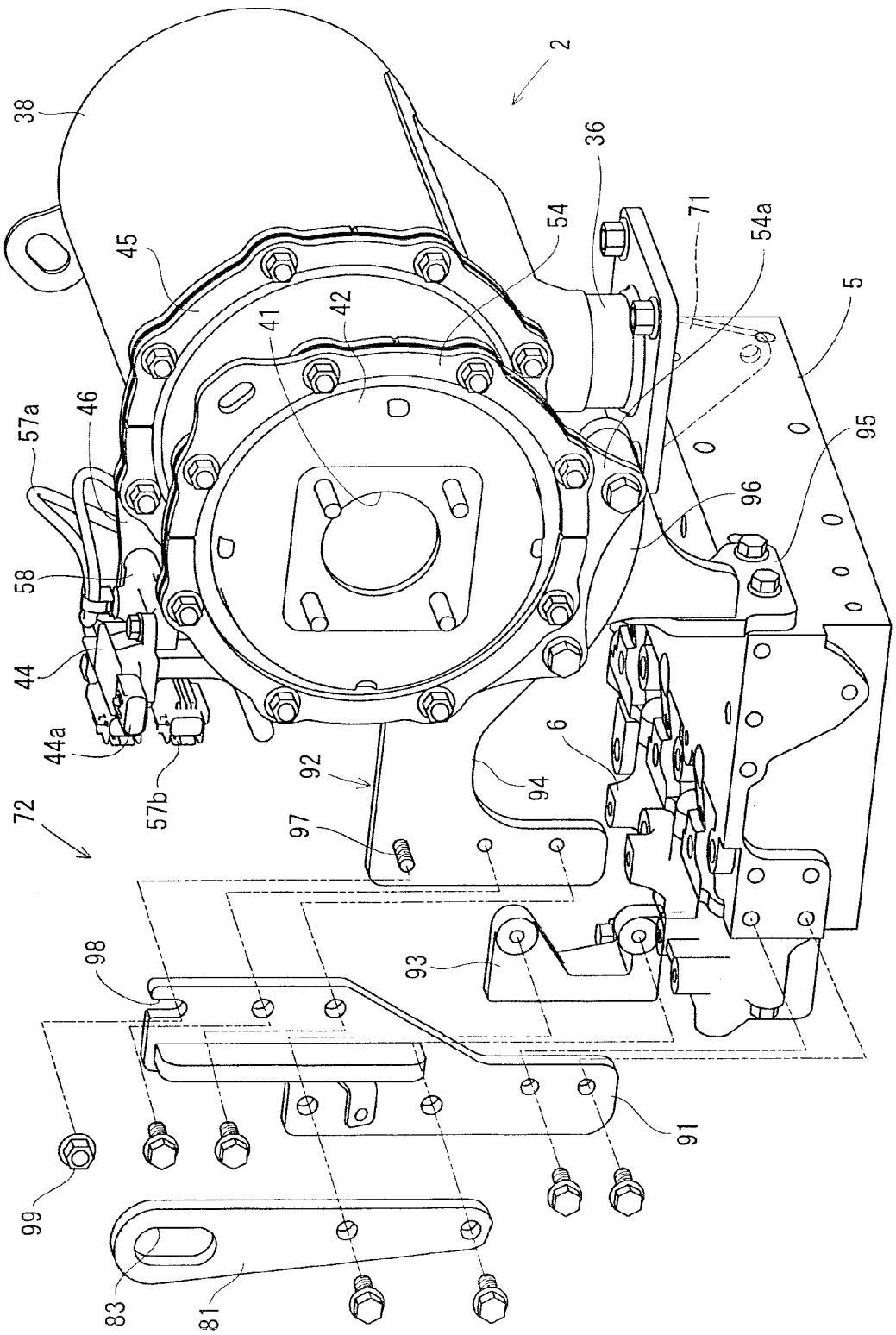
FIG. 29 is an exploded perspective view of an intake-side bracket.
Figure 30:
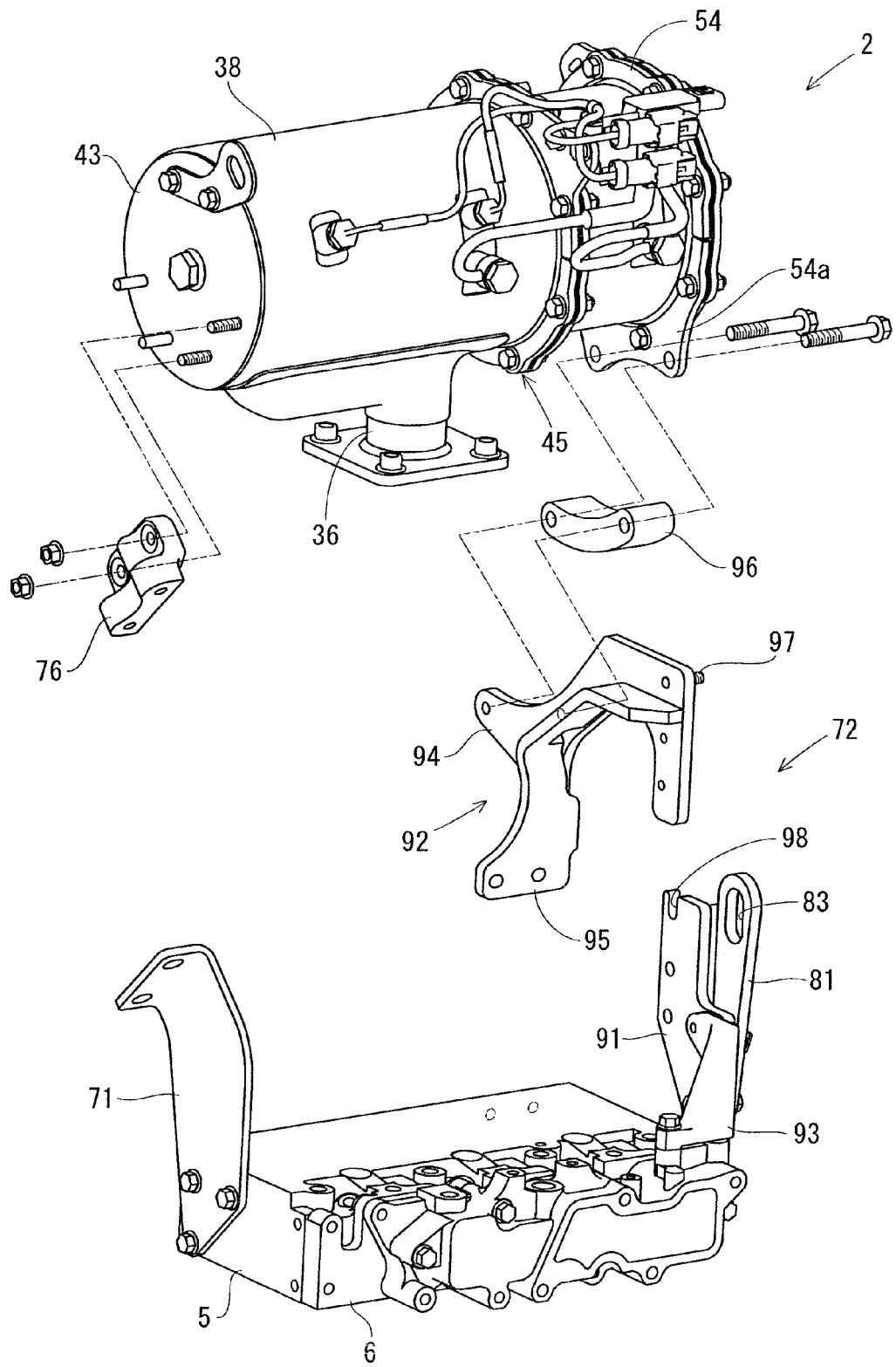
FIG. 30 is an exploded perspective view of the whole bracket bodies.

As shown in FIGS. 24 to 26 in detail, the engine 1 includes an inlet-side bracket body 71 and an outlet-side bracket body 72 to support and secure the exhaust gas purifier 2. The inlet-side bracket body 71 and the outlet-side bracket body 72 are formed to be wide in a direction intersecting the output shaft 3 of the engine 1. The inlet-side bracket body 71 and the outlet-side bracket body 72 are detachably secured to the cylinder head 5 of the engine 1. The inlet-side bracket body 71 and the outlet-side bracket body 72 stand separately on the front side and the rear side of the cylinder head 5 in the direction intersecting the output shaft 3. The inlet-side bracket body 71, which is located on the rear side of the cylinder head 5, supports the exhaust upstream side of the purification casing 38. The outlet-side bracket body 72, which is located on the front side of the cylinder head 5, supports the exhaust downstream side of the purification casing 38. The inlet-side bracket body 71 and the outlet-side bracket body 72 are equivalent to mounting bases.

As shown in FIGS. 25, 28, and 30 to 32, as described above, the inlet-side bracket body 71 is located on the rear side of the cylinder head 5 (above the mounting plate 10). A lower end of the inlet-side bracket body 71 is fastened by bolts to a rear surface of the cylinder head 5. An extension bracket 76 is fastened by bolts to an upper end of the inlet-side bracket body 71. A distal end of the extension bracket 76 is fastened, through bolts and nuts, to the inlet-side lid member 43 to close the end portion of the purification casing 38 on the exhaust upstream side. As a result, the exhaust upstream side of the purification casing 38 is detachably secured to the rear surface of the cylinder head 5 through the inlet-side bracket body 71.

As shown in FIGS. 26 to 32, as described above, the outlet-side bracket body 72 is located on the front side of the cylinder head 5 (on the cooling fan 9 side). The outlet-side bracket body 72 in this embodiment is separated into an intake-side bracket 91 and an exhaust-side bracket 92.

A lower end of the intake-side bracket 91 is fastened by bolts to the front side of the cylinder head 5. A reinforcement bracket 93 is fastened by bolts to the upper surface of the intake manifold 6. The intake-side bracket 91 and the reinforcement bracket 93 are fastened by bolts to each other in such a manner that a front side of the reinforcement bracket 93 is disposed over a vertically middle portion of the rear surface of the intake-side bracket 91. It should be noted that a first hanger 81, which will be described later, is attached to a vertically middle portion of the front surface of the intake-side bracket 91. In this case, the first hanger 81, the intake-side bracket 91, and the reinforcement bracket 93 are fastened together in such a manner that the vertically middle portion of the intake-side bracket 91 is clamped between the reinforcement bracket 93 and the first hanger 81.

The exhaust-side bracket 92 includes a front frame 94 having an approximate C-shape opened downwardly. A rear frame 95 of a plate having a cross-section slightly folded horizontally in the middle is welded to a rear surface of the front frame 94. In this embodiment, a proximal end of the front frame 95 is fastened by bolts to a bracket fastening portion 54a of an outlet clamping flange 54 on the purification casing 38 through a spacer 96. That is, one end of the exhaust gas purifier 2 is coupled to the exhaust-side bracket 92. It should be noted that, depending on a mounting position of the exhaust gas purifier 2 with respect to the engine 1, one end of the exhaust gas purifier 2 may be coupled to the intake-side bracket 91.

As shown in FIGS. 26, 27, 29, and 31, a stud bolt 97 serving as an engagement shaft is disposed on a distal end side of the front frame 94 of the exhaust-side bracket 92. The stud bolt 97 protrudes forwardly from the front surface of the front frame 94. A provisional fastening notch 98 opened upwardly is formed in an upper end of the intake-side bracket 91. Specifically, a bolt hole for inserting the stud bolt 97 formed in the upper end of the intake-side bracket 91 is notched to be opened upwardly, thereby forming the provisional fastening notch 98. The stud bolt 97 of the front frame 94 is to engage with the provisional fastening notch 98 on the upper end of the intake-side bracket 91. A distal end of the front surface of the front frame 94 of the exhaust-side bracket 92 is disposed over the upper end of the rear surface of the intake-side bracket 91, and the stud bolt 97 is engaged with the provisional fastening notch 98. Thus, the exhaust-side bracket 92 with the purification casing 38 above is supported by the intake-side bracket 91.

The stud bolt 97 and the provisional fastening notch 98 are engaged with each other to hold the exhaust downstream side of the purification casing 38 at a predetermined position. Specifically, the engagement of the stud bolt 97 and the provisional fastening notch 98 facilitates positioning of the exhaust-side bracket 92 with respect to the intake-side bracket 91, and at the same time, positioning of the exhaust gas purifier 2 with respect to the engine 1. It should be noted that, contrary to this embodiment, the stud bolt 97 may be disposed on the intake-side bracket 91, and the provisional fastening notch 98 may be formed in the exhaust-side bracket 92. An opening direction of the provisional fastening notch 98 may be set based on the positional relationship with the stud bolt 97, and will not be limited to the upward direction.

Figure 31:
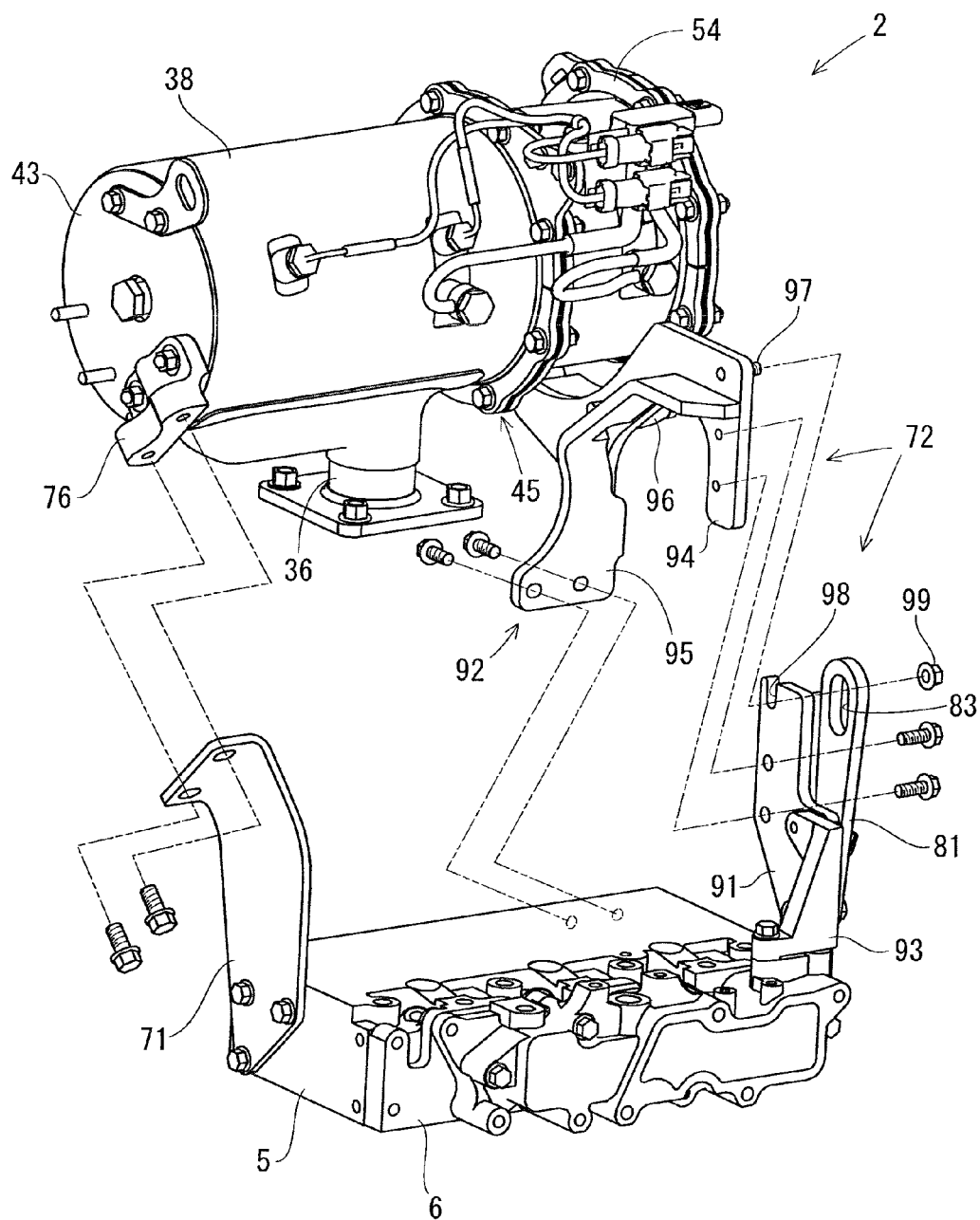
FIG. 31 is an exploded perspective view for describing an attachment state of the exhaust gas purifier.
Figure 32:
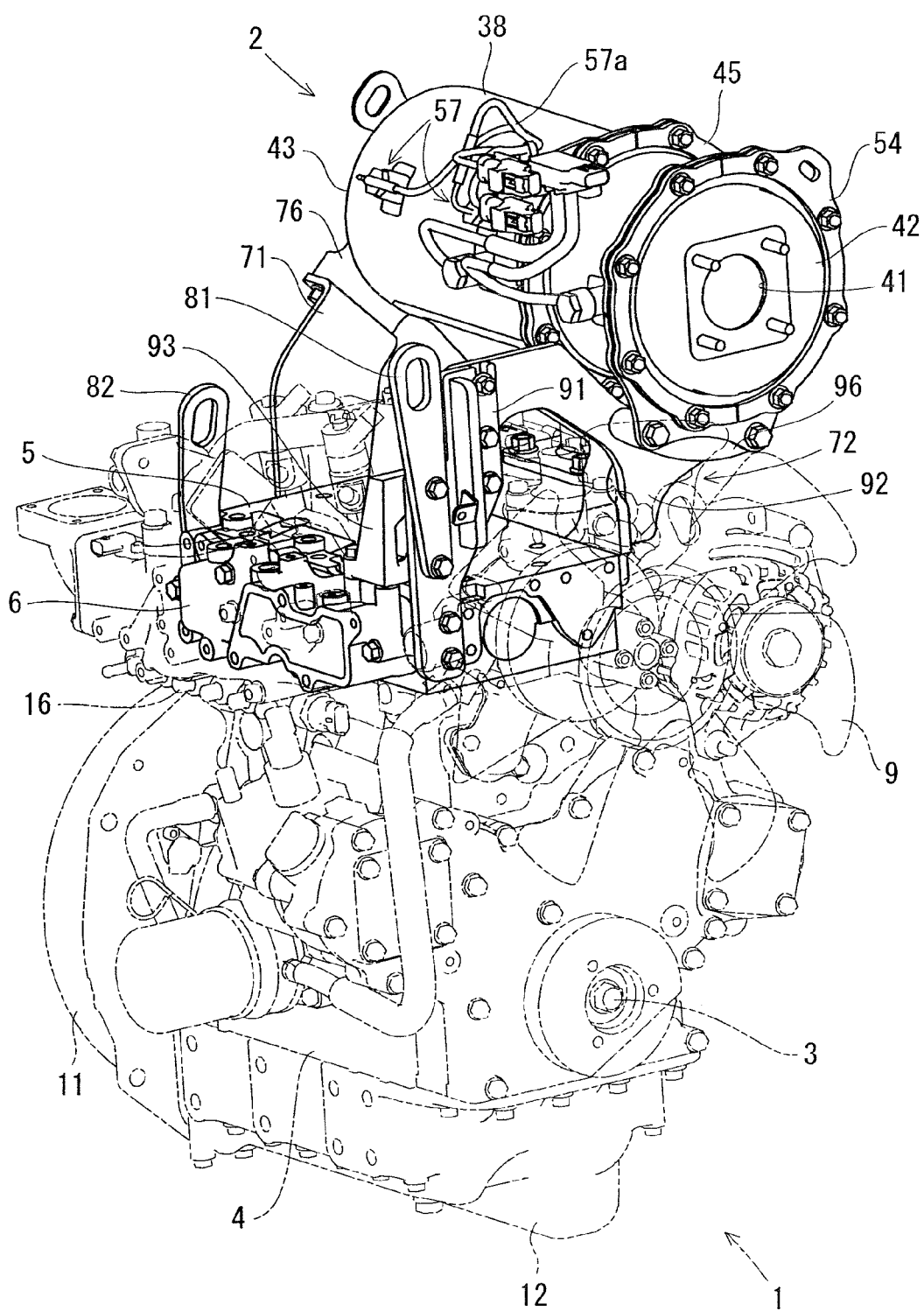
FIG. 32 is an upper front perspective view illustrating a positional relationship between the cylinder head and the exhaust gas purifier.

As shown in FIG. 31, while the stud bolt 97 is engaged with the provisional fastening notch 98, the distal end of the front surface of the front frame 94 of the exhaust-side bracket 92 and the upper end of the rear surface of the intake-side bracket 91 are fastened to each other by bolts. Then, an engagement nut 99 is tightened on the stud bolt 97 (additional tightening is performed) to couple the one end of the intake-side bracket 91 and the one end of the exhaust-side bracket 92 to each other. The lower end of the rear frame 95 of the exhaust-side bracket 92 is fastened by bolts to a front portion of the left side surface of the cylinder head 5.

As a result, the exhaust downstream side of the purification casing 38 is detachably secured to the front surface and the front portion of the left side surface (the front side) of the cylinder head 5 through the outlet-side bracket body 72.

With this configuration, the engagement of the stud bolt 97 and the provisional fastening notch 98 facilitates positioning of the exhaust-side bracket 92 with respect to the intake-side bracket 91, and at the same time, positioning of the exhaust gas purifier 2 with respect to the engine 1. Furthermore, there is no need to execute assembling operation such as bolt fastening and disassembling operation while sustaining the whole weight of the exhaust gas purifier 2. This significantly reduces labor and time at the time of mounting and dismounting operation of the exhaust gas purifier 2 and assembling and disassembling operation of the exhaust gas purifier 2.

As is apparent from the above description and FIGS. 26 to 31, the intake-side bracket 91 and the exhaust-side bracket 92 are provided as one of the mounting bases to support one end of the exhaust gas purifier 2 (outlet-side bracket body 72). The one end of the intake-side bracket 91 and the one end of the exhaust-side bracket 92 are fastened to each other whereas the other end of the intake-side bracket 91 and the other end of the exhaust-side bracket 92 are coupled to the engine 1 (cylinder head 5) side. Consequently, the mounting base (outlet-side bracket body 72) is separated into the intake-side bracket 91 and the exhaust-side bracket 92. While the brackets 91 and 92 as single parts are reduced in weight, the brackets 91 and 92 are fastened to each other to secure a sufficient strength of support, which enables the exhaust gas purifier 2 to be stably mounted on the engine 1. This therefore prevents degradation and damage of the exhaust gas purifier 2 due to vibration of the engine 1, for example. Thus, durability of the exhaust gas purifier 2 is improved.

As is apparent from the above description and FIGS. 26 to 31, one end of the exhaust gas purifier 2 is coupled to one of the intake-side bracket 91 and the exhaust-side bracket 92. Consequently, the exhaust gas purifier 2 is mounted on or dismounted from the engine 1 while one of the intake-side bracket 91 and the exhaust-side bracket 92 is coupled to the one end of the exhaust gas purifier 2. This improves assembling workability of the exhaust gas purifier 2 with respect to the engine 1. Moreover, the other of the intake-side bracket 91 and the exhaust-side bracket 92 may be used for a mounting base of the hanger 81 to hang the engine 1.

As is apparent from the above description and FIGS. 26 to 31, the provisional fastening notch 98 is formed in one of the intake-side bracket 91 and the exhaust-side bracket 92. The engagement shaft 97, which is disposed on the other of the intake-side bracket 91 and the exhaust-side bracket 92, is to engage with the provisional fastening notch 98. Therefore, the engagement of the engagement shaft 97 and the provisional fastening notch 98 facilitates positioning of one of the brackets 91 (92) with respect to the other bracket 92 (91), and at the same time, positioning of the exhaust gas purifier 2 with respect to the engine 1. Furthermore, there is no need to execute assembling operation such as bolt fastening and disassembling operation while sustaining the whole weight of the exhaust gas purifier 2. This significantly reduces labor and time at the time of mounting and dismounting operation of the exhaust gas purifier 2 and assembling and disassembling operation of the exhaust gas purifier 2.

In particular, as described above, the lower ends of the inlet-side bracket body 71 and the outlet-side bracket body 72 are fastened to the cylinder head 5 to set a mounting reference position of the exhaust gas purifier 2 with respect to the engine 1 highly accurately. Therefore, although the exhaust gas purifier 2 has a larger weight than a post-processing device such as a muffler, the exhaust gas purifier 2 is mounted at a predetermined position appropriately.

Next, referring to FIGS. 22 to 28, hangers 81 and 82 used for mounting and dismounting the engine 1 on and from the working machine and an attachment configuration of the hangers 81 and 82 in the third embodiment will be described. The engine 1 in the third embodiment includes a pair of hangers 81 and 82. In order to lift the engine 1 with the exhaust gas purifier 2, which has a large weight, in a stable posture (in a balanced manner), the pair of hangers 81 and 82 are separately disposed on both sides of the engine 1 in a direction intersecting the output shaft 3. The hangers 81 and 82 in the third embodiment are separately disposed on the front side and the rear side of the cylinder head 5 of the engine 1. Of the pair of hangers 81 and 82, the second hanger 82 is made of a longitudinal metal plate. A through hanging hole 86 through which, for example, wire rope is inserted is formed in an upper end of the second hanger 82. A lower end of the second hanger 82 is fastened by bolts to the rear surface of the cylinder head 5.

The first hanger 81 is also made of a longitudinal metal plate. A through hanging hole 83 through which, for example, wire rope is inserted is formed in an upper end of the first hanger 81. The lower end of the second hanger 82 is fastened by bolts to the rear surface of the cylinder head 5. A lower end of the first hanger 81 is fastened by bolts to the intake-side bracket 91. In this case, the reinforcement bracket 93 fastened by bolts to the upper surface of the intake manifold 6 and the lower end of the first hanger 81 clamp a vertically middle portion of the intake-side bracket 91. In this clamped state, the first hanger 81, the intake-side bracket 91, and the reinforcement bracket 93 are fastened together. It should be noted that, contrary to the third embodiment, the first hanger 81 may be disposed on the exhaust-side bracket 92.

The strength of the first hanger 81 is set to be smaller than strengths of the intake-side bracket 91 and the reinforcement bracket 93. When an excessively large external force is exerted at the time of, for example, lifting the engine 1, plastic deformation or breakage of the first hanger 81 may be induced faster than the intake-side bracket 91 and the reinforcement bracket 93. This setting of strength of the first hanger 81 prevents deformations of the intake-side bracket 91 and the reinforcement bracket 93 by lifting of the engine 1. As a result, exertion of external force on the exhaust gas purifier 2 is minimized at the time of lifting of the engine 1.

In the above-described configuration, when the engine 1 is mounted on and dismounted from the working machine, wire rope, for example, is inserted through the through hanging holes 83 and 86 formed in the first and second hangers 81 and 82, and the wire rope is engaged with such a component as a hook of a chain block. Thus, the engine 1 is lifted.

When the configuration of the third embodiment is employed, the same effect as in the first and second embodiments is obtained. Specifically, the lower end of the hanger 81 to lift the engine 1 is fastened to one of the intake-side bracket 91 and the exhaust-side bracket 92. Consequently, one of these two brackets 91 and 92, which are highly rigid components to support the exhaust gas purifier 2, is also used for a fastening portion of the hanger 81. This reduces the number of components, and at the same time, the hanger 81 is firmly fastened to the engine 1 (the coupling strength of the hanger 81 with respect to the engine 1 is secured).

As is apparent from the above description and FIGS. 1 to 8, the engine apparatus includes the exhaust gas purifier 2 to purify exhaust gas from the engine 1. The exhaust gas purifier 2 is mounted on the engine 1 with the longitudinal direction of the exhaust gas purifier 2 being orthogonal to the output shaft 3 of the engine 1. The cooling fan 9 is disposed on one side surface of the engine 1 that intersects the output shaft 3. The exhaust gas purifier 2 is supported by the cylinder head 5 at the portion on the upper surface of the engine 1 that is closer to the cooling fan 9. Although the engine 1 after assembled with the exhaust gas purifier 2 is to be shipped, the exhaust gas purifier 2 is supported with high rigidity by the cylinder head 5, which is a highly rigid component of the engine 1. This prevents vibration or such a factor from damaging the exhaust gas purifier 2.

Moreover, the exhaust gas purifier 2 communicates with the exhaust manifold 7 at close range. This facilitates maintenance of the exhaust gas purifier 2 at appropriate temperature and ensures maintenance of high performance of exhaust gas purification. As a result, the exhaust gas purifier 2 is reduced in size. In addition, the exhaust gas purifier 2 is disposed on the portion on the upper surface of the engine 1 that is closer to the cooling fan 9. Consequently, the cylinder head 5, the intake manifold 6 and the exhaust manifold 7 are exposed upwardly over a wide range, which facilitates maintenance work in relation to the engine 1.

As is apparent from the above description and FIGS. 5 to 8, the exhaust gas purifier 2 is located above the cylinder head 5 between the head cover 8 and the cooling fan 9. Consequently, the dead space above the engine 1 between the head cover 8 and the cooling fan 9 is effectively utilized to dispose the exhaust gas purifier 2. Therefore, even after the engine 1 is assembled with the exhaust gas purifier 2, the overall height of the engine 1 is reduced as much as possible, thereby making the engine 1 compact.

As is apparent from the above description and FIGS. 1 to 4, the electric wiring connector 44a for the detection member 44 with respect to the exhaust gas purifier 2 is disposed on the outer peripheral portion of the exhaust gas purifier 2 that is on the side opposite the side of the cooling fan 9. Consequently, the electric wiring connector 44a is positioned at a height approximately equal to or lower than the upper end of the exhaust gas purifier 2. This minimizes or eliminates the influence of the arrangement of the electric wiring connector 44a on the overall height of the engine 1 including the exhaust gas purifier 2. Accordingly, the overall height of the engine 1, which is assembled with the exhaust gas purifier 2, is effectively reduced as much as possible. In this respect as well, the engine 1 is made compact.

As is apparent from the above description and FIGS. 1 to 4, the intake manifold 6 and the exhaust manifold 7 are separately disposed on both side surfaces of the engine 1 along the output shaft 3. The power generator 23 is disposed on the exhaust manifold 7 side of the engine 1. The EGR device 26 is disposed on the intake manifold 6 side of the engine 1. The coolant pump 21 is disposed on the cooling fan 9 side of the engine 1. The exhaust gas purifier 2 is positioned in the range of the installation width of the power generator 23 and the EGR device 26 and above the coolant pump 21. Accordingly, the overall width of the engine 1, which is assembled with the exhaust gas purifier 2, is reduced as much as possible. In this respect as well, the engine 1 is made compact. Moreover, for example, the pipe 64 between the turbosupercharger 60 and the exhaust gas purifier 2, and the pipe 66 between the turbosupercharger 60 and the EGR device 26 are disposed not to be restricted by the exhaust gas purifier 2. This improves the degree of freedom of the arrangement of the pipes 64 and 66. Furthermore, the cooling wind from the cooling fan 9 directly blows against the coolant pump 21, and consequently, the existence of the exhaust gas purifier 2 does not hinder air cooling of the coolant pump 21.

As is apparent from the above description and FIGS. 9 to 11, the engine apparatus includes the exhaust gas purifier 2 to purify exhaust gas from the engine 1, and the exhaust gas purifier 2 is mounted above the engine 1 through the mounting base 70. The two kinds of bracket bodies 71 and 72 are coupled to constitute the single mounting base 70. The exhaust gas purifier 2 is supported by both of the bracket bodies 71 and 72. Consequently, as compared with the above-described conventional technique of supporting the exhaust gas purifier using the intake manifold and the exhaust manifold, the restriction of the arrangement of the exhaust gas purifier 2 is lessened. This improves the degree of arrangement freedom of the exhaust gas purifier 2 above the engine 1. Through the single mounting base 70 made up of the two kinds of bracket bodies 71 and 72, the exhaust gas purifier 2 is mounted above the engine 1 while saving arrangement space and securing sufficient support strength.

As is apparent from the above description and FIGS. 9 to 11, the two bracket bodies 71 and 72 have different materials. One of the bracket bodies is the cast-iron bracket body 72 whereas the other of the bracket bodies is the sheet-metal bracket body 71. Since the cast-iron bracket body 72 is fastened to the cylinder head 5 of the engine 1, the reference position of attachment of the exhaust gas purifier 2 to the engine 1 is set highly accurately. Therefore, even the exhaust gas purifier 2, which is heavier than a post-processing device such as a muffler, is suitably mounted at a predetermined position.

As is apparent from the above description and FIGS. 9 to 11, the two bracket bodies 71 and 72 have different materials. One of the bracket bodies is the cast-iron bracket body 72 whereas the other of the bracket bodies is the sheet-metal bracket body 71. The upper end of the cast-iron bracket body 72 is fastened to the exhaust gas purifier 2 while the lower end of the cast-iron bracket body 72 is fastened to the cylinder head 5 of the engine 1. Through the auxiliary sheet-metal bracket 73, the vertically middle portion of the cast-iron bracket body 72 is coupled to the intake manifold 6 of the engine 1. Consequently, the intake manifold 6 and the cast-iron bracket body 72 are coupled through the auxiliary sheet-metal bracket 73 to secure sufficient coupling strength (rigidity) of the cast-iron bracket body 72 with respect to the engine 1. This prevents vibration of the engine 1 or such a factor from degrading and damaging the exhaust gas purifier 2, thus contributing to improvement in durability of the exhaust gas purifier 2.

As is apparent from the above description and FIGS. 12 to 15, and 21 to 23, the engine apparatus includes the exhaust gas purifier 2 to purify exhaust gas from the engine 1 that is mounted on the engine 1 through the mounting base 70. The lower end of the hanger 81 to lift the engine 1 is fastened to the mounting base 70 (72) whereas the upper end of the hanger 81 is extended along the outer periphery of the exhaust gas purifier 2. Consequently, the mounting base 70 (72) to support the exhaust gas purifier 2 is also used for the fastening portion with respect to the hanger 81. This reduces the number of components, and at the same time, the hanger 81 is firmly fastened to the engine 1 (the coupling strength of the hanger 81 with respect to the engine 1 is secured). Moreover, while balancing the whole engine 1 at the time of lifting and avoiding interference between the exhaust gas purifier 2 and the hanger 81, the hanger 81 is assembled with the engine 1 in reduced space.

As is apparent from the above description and FIGS. 12 to 15, and 21 to 23, the fastening portion with respect to the hanger 81 is formed in the outer surface of the mounting base 70 (72). Therefore, the fastening members 84 to fasten the hanger 81 to the mounting base 70 (72) are readily tightened.

Furthermore, the strength of the hanger 81 is set to be smaller than the strength of the mounting base 70 (72). This prevents deformation of the mounting base 70 (72) by lifting the engine 1. As a result, exertion of external force on the exhaust gas purifier 2 is minimized at the time of lifting the engine 1.

As is apparent from the above description and FIGS. 12 to 15, and 21 to 23, the cast-iron bracket body 72 and the sheet-metal bracket body 71 are coupled to constitute the single mounting base 70, and the lower end of the hanger 81 is fastened to the cast-iron bracket body 72. Therefore, through the mounting base 70 made up of the cast-iron bracket body 72 and the sheet-metal bracket body 71, the exhaust gas purifier 2 is mounted on the engine 1 while saving space and securing sufficient support strength. Coupling with the sheet-metal bracket body 71 complements strength of the cast-iron bracket body 72, and more reliably prevents external force from being exerted on the exhaust gas purifier 2 at the time of lifting the engine 1.

It should be noted that the configurations of the components in the present invention should not be limited to the embodiment illustrated in the drawings. Various modifications are possible within the scope of the present invention.

DESCRIPTION OF THE REFERENCE NUMERAL

1 Engine
2 Exhaust gas purifier
3 Output shaft
4 Cylinder block
5 Cylinder head
6 Intake manifold
7 Exhaust manifold
8 Head cover
9 Cooling fan
70 Mounting base
71 Inlet-side bracket body (sheet-metal bracket body)
72 Outlet-side bracket body (die-cast bracket body)
73 Coupling bracket (auxiliary sheet-metal bracket)
81 First hanger
82 Second hanger

The invention claimed is:

1. An engine apparatus comprising an exhaust gas purifier configured to purify exhaust gas from an engine and mounted on the engine through a mounting base, wherein the mounting base is attached to a cylinder head of the engine, a lower end of a hanger configured to lift the engine together with the exhaust gas purifier is fastened only to the mounting base, and by a fastener comprising a bolt, and an upper end of the hanger in which a through hanging hole is formed extends upwardly along an outer periphery of the exhaust gas purifier.

2. The engine apparatus according to claim 1, wherein a fastening portion with respect to the hanger is formed in an outer surface of the mounting base.

3. The engine apparatus according to claim 2, wherein a strength of the hanger is less than a strength of the mounting base.

4. The engine apparatus according to claim 3, wherein a cast-iron bracket body and a sheet-metal bracket body are coupled to constitute the single mounting base, the lower end of the hanger being fastened to the cast-iron bracket body.

5. The engine apparatus according to claim 1, wherein the hanger is configured in a crank-shape so as to skit the outer periphery of the exhaust gas purifier.

6. The engine apparatus according to claim 1, wherein the mounting base comprises two mounting brackets spaced from one another, and the hanger is fastened to one mounting bracket.

* * * * *